US011917951B2

United States Patent
Nie et al.

(10) Patent No.: US 11,917,951 B2
(45) Date of Patent: Mar. 5, 2024

(54) SWEEPER HEAD AND HAND-HELD SWEEPER

(71) Applicant: Nanjing Chervon Industry Co., Ltd., Nanjing (CN)

(72) Inventors: Fangjie Nie, Nanjing (CN); Chengxin Pan, Nanjing (CN); Toshinari Yamaoka, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 897 days.

(21) Appl. No.: 16/877,793

(22) Filed: May 19, 2020

(65) Prior Publication Data

US 2020/0367451 A1 Nov. 26, 2020

(30) Foreign Application Priority Data

| May 22, 2019 | (CN) | 201910428584.5 |
| May 22, 2019 | (CN) | 201920746544.0 |
| Oct. 29, 2019 | (CN) | 201911040426.9 |

(51) Int. Cl.
*A01G 20/43* (2018.01)
*A46B 13/00* (2006.01)
(Continued)

(52) U.S. Cl.
CPC ............ *A01G 20/43* (2018.02); *A46B 13/001* (2013.01); *A46B 13/02* (2013.01); *A47L 11/4041* (2013.01); *A46B 2200/30* (2013.01)

(58) Field of Classification Search
CPC ........ A01B 45/00; A01G 20/35; A01G 20/40; A01G 20/43; E01H 1/045; E01H 1/056; E01H 5/098; A46B 13/001; A46B 13/006; A46B 13/02; A46B 2200/30; A46B 2200/3073; A47L 11/4041

See application file for complete search history.

(56) References Cited

U.S. PATENT DOCUMENTS 1,721,655 A * 7/1929 Carlson ................ A46B 13/02
15/23
2,753,583 A * 7/1956 Jepson ................ A01K 13/002
15/23

(Continued)

FOREIGN PATENT DOCUMENTS

| CN | 106385982 A | 2/2017 |
| CN | 112293030 B | 7/2022 |
| WO | 2017215051 A1 | 12/2017 |

*Primary Examiner* — Randall E Chin
(74) *Attorney, Agent, or Firm* — Greenberg Traurig, LLP

(57) ABSTRACT

A sweeper head includes a cleaning device, a transmission shaft, and a shield. The cleaning device includes a rolling member rotatable about a first axis and a cleaning element. The transmission shaft is rotatable about a second axis. The shield includes a surrounding portion for surrounding at least a part of the cleaning element. The surrounding portion includes a front surrounding portion and a rear surrounding portion located on two sides of a first plane and the first plane passes through the second axis and is parallel to the first axis. The ratio of a maximum measurement of the front surrounding portion in a direction parallel to the first axis to a maximum measurement of the rear surrounding portion in the direction is greater than or equal to 2 and is less than or equal to 3.

20 Claims, 23 Drawing Sheets

(51) Int. Cl.
*A46B 13/02* (2006.01)
*A47L 11/40* (2006.01)

(56) References Cited

U.S. PATENT DOCUMENTS

| | | | | |
|---|---|---|---|---|
| 3,793,782 | A * | 2/1974 | Bowling | B24B 23/02 |
| | | | | 15/23 |
| 4,926,516 | A * | 5/1990 | Valvo | A47L 11/4041 |
| | | | | 15/23 |
| 5,442,901 | A | 8/1995 | Niemela | |
| 7,631,388 | B2 * | 12/2009 | Stark | E01H 1/056 |
| | | | | 15/49.1 |
| 2005/0132691 | A1 * | 6/2005 | Mayer | A01G 20/35 |
| | | | | 56/344 |
| 2012/0189372 | A1 * | 7/2012 | Burnett | A46B 13/001 |
| | | | | 401/282 |
| 2013/0212815 | A1 * | 8/2013 | Kempf | E01H 1/056 |
| | | | | 173/184 |
| 2015/0034391 | A1 * | 2/2015 | McLain | A46B 13/02 |
| | | | | 15/97.1 |
| 2018/0333753 | A1 * | 11/2018 | Nolin | E01H 1/056 |

* cited by examiner

SWEEPER HEAD AND HAND-HELD SWEEPER

RELATED APPLICATION INFORMATION

This application claims the benefit under 35 U.S.C. § 119(a) of Chinese Patent Application No. CN 201910428584.5, filed on May 22, 2019, Chinese Patent Application No. CN 201920746544.0, filed on May 22, 2019, and Chinese Patent Application No. CN 201911040426.9, filed on Oct. 29, 2019, which applications are incorporated by reference in their entirety herein.

TECHNICAL FIELD

The present disclosure relates to a garden tool and, in particular, to a sweeper head and a hand-held sweeper using the sweeper head.

BACKGROUND

As a garden tool, a hand-held sweeper can be operated by a user to clean grass clippings, leaves or the like in courtyards or gardens. Some existing hand-held sweepers each have a single operating mode and a complex structure. As a result, these sweepers are each applicable to a single working condition and are not easy for users to operate. In fact, in some other types of hand-held sweepers, the shield of the sweeper head of each sweeper cannot be adaptively installed according to different operating modes of users. That is, the shield of the sweeper head has a single protection mode and cannot adapt to different working conditions. Currently, it is urgent to solve the problem of how to provide a shield applicable to different working conditions and operating modes, a sweeper head that has an effective protection function, and a hand-held sweeper using the sweeper head.

SUMMARY

In one described example, a sweeper head applicable to a hand-held sweeper includes a cleaning device, a transmission shaft, a shield and a connecting rod. The cleaning device includes a rolling member rotatable about a first axis and a cleaning element installed on the rolling element. The transmission shaft is configured to transmit power to the sweeper head and is rotatable about a second axis. The shield includes a surrounding portion for surrounding at least a part of the cleaning element. The cleaning element is installed at an end of the connecting rod. The surrounding portion includes a front surrounding portion and a rear surrounding portion located on two sides of a first plane, and the first plane passes through the second axis and is parallel to the first axis. The ratio of a maximum measurement L1 of the front surrounding portion in a direction parallel to the first axis to a maximum measurement L2 of the rear surrounding portion in the direction parallel to the first axis is greater than or equal to 2 and is less than or equal to 3.

In one described example, the front surrounding portion and the rear surrounding portion are integrally formed.

In one described example, the shield has an inner surface facing the cleaning element and an outer surface opposite to the inner surface, a reinforcing rib is integrally formed on the inner surface or the outer surface, and the reinforcing rib extends from the rear surrounding portion to two sides of the front surrounding portion arranged in the direction parallel to the first axis.

In one described example, a minimum distance between the surrounding portion and the cleaning element is greater than or equal to 15 millimeters and is less than or equal to 30 millimeters.

In one described example, the ratio of the maximum measurement L1 of the front surrounding portion in the direction parallel to the first axis to the maximum measurement L2 of the rear surrounding portion in the direction parallel to the first axis is greater than or equal to 2.2 and is less than or equal to 2.6.

In one described example, a projection of the surrounding portion on a plane perpendicular to the first axis extends substantially along an arc, an edge of a projection of the cleaning device on the plane perpendicular to the first axis is substantially a circle, and a point of intersection of the arc and the first plane is defined to be an installation point of the shield; the arc has a first end and a second end, and a distance between the first end and the installation point is greater than a distance between the second end and the installation point; where a distance D obtained by subtracting a radius R of the circle from a distance L between the first end and a center of the circle is greater than or equal to 35 millimeters and is less than or equal to 70 millimeters.

In one described example, the distance D obtained by subtracting the radius R of the circle from the distance L between the first end and the center of the circle is greater than or equal to 35 millimeters and is less than or equal to 50 millimeters.

In one described example, a projection of the shield on a plane perpendicular to the first axis is substantially an arc, and an included angle formed by intersection of a connection line between one end of the arc and the first axis and a connection line between the other end of the arc and the first axis is greater than or equal to 120 degrees and is less than or equal to 150 degrees.

In one described example, a projection of the shield on a plane perpendicular to the first axis is substantially an arc, a point of intersection of the arc and the first plane is defined to be an installation point of the shield, the arc has a first end and a second end, a distance between the first end and the installation point is greater than a distance between the second end and the installation point, a first included angle is formed by intersection of a connection line between the first end and the first axis and a connection line between the installation point and the first axis, a second included angle is formed by intersection of a connection line between the second end and the first axis and the connection line between the installation point and the first axis, and the ratio of the first included angle to the second included angle is greater than or equal to 5 and less than or equal to 7.

In one described example, the sweeper head further includes a retarding mechanism, a housing, and an installing assembly. The retarding mechanism is configured for power transmission between the transmission shaft and the cleaning device, and includes a drive shaft for driving the cleaning element to rotate. The housing is configured to accommodate at least a part of the retarding mechanism and connected to the connecting rod. The installation assembly is for installation of the shield to the housing or the connecting rod and enabling the retarding mechanism to have a first installation state and a second installation state. When the retarding mechanism is in the first installation state, a preset gap is provided between an inner side of the surrounding portion and the cleaning element. When the retarding mechanism is in the second installation state, a preset gap is provided between the inner side of the surrounding portion and a tail end of the cleaning element.

In one described example, when the retarding mechanism is in the first installation state, the front surrounding portion is located at a front of the first plane, and the rear surrounding portion is located at a rear of the first plane; when the retarding mechanism is in the second installation state, the front surrounding portion is located at a front of the first plane, and the rear surrounding portion is located at the rear of the first plane.

In one described example, an angle of rotation from a position of the retarding mechanism with respect to the shield when the retarding mechanism is in the second installation state to a position of the retarding mechanism with respect to the shield when the retarding mechanism is in the first installation state is 180 degrees; a surface area of the front surrounding portion is greater than a surface area of the rear surrounding portion; when the retarding mechanism is in a first installation state, a minimum distance between the front surrounding portion and the cleaning element is greater than or equal to 10 millimeters; when the retarding mechanism is in the second installation state, the minimum distance between the front surrounding portion and the cleaning element is greater than or equal to 10 millimeters.

In one described example, the rear surrounding portion extends substantially on a plane perpendicular to the second axis.

In one described example, a projection of the surrounding portion in a second plane perpendicular to the first axis extends substantially along an arc, an edge of a projection of the cleaning device in the second plane perpendicular to the first axis is substantially a circle, and a distance between the arc and the circle increases and then decreases.

In one described example, a hand-held sweeper includes a power head, a cleaning device, a transmission shaft, a shield and a connecting rod. The power head includes a motor for outputting power. The cleaning device includes a rolling element rotatable about a first axis and a cleaning element installed on the rolling element. The transmission shaft is configured to transmit power to the sweeper head and rotatable about a second axis. The shield includes a surrounding portion for surrounding at least a part of the cleaning element. The cleaning device is installed at one end of the connecting rod, and the power head is installed at the other end of the connecting rod. The surrounding portion includes a front surrounding portion and a rear surrounding portion located on two sides of a first plane, and the first plane passes through the second axis and is parallel to the first axis. The ratio of a maximum measurement L1 of the front surrounding portion in the direction parallel to the first axis to a maximum measurement L2 of the rear surrounding portion in the direction parallel to the first axis is greater than or equal to 2 and is less than or equal to 3.

DETAILED DESCRIPTION

Figure 1:
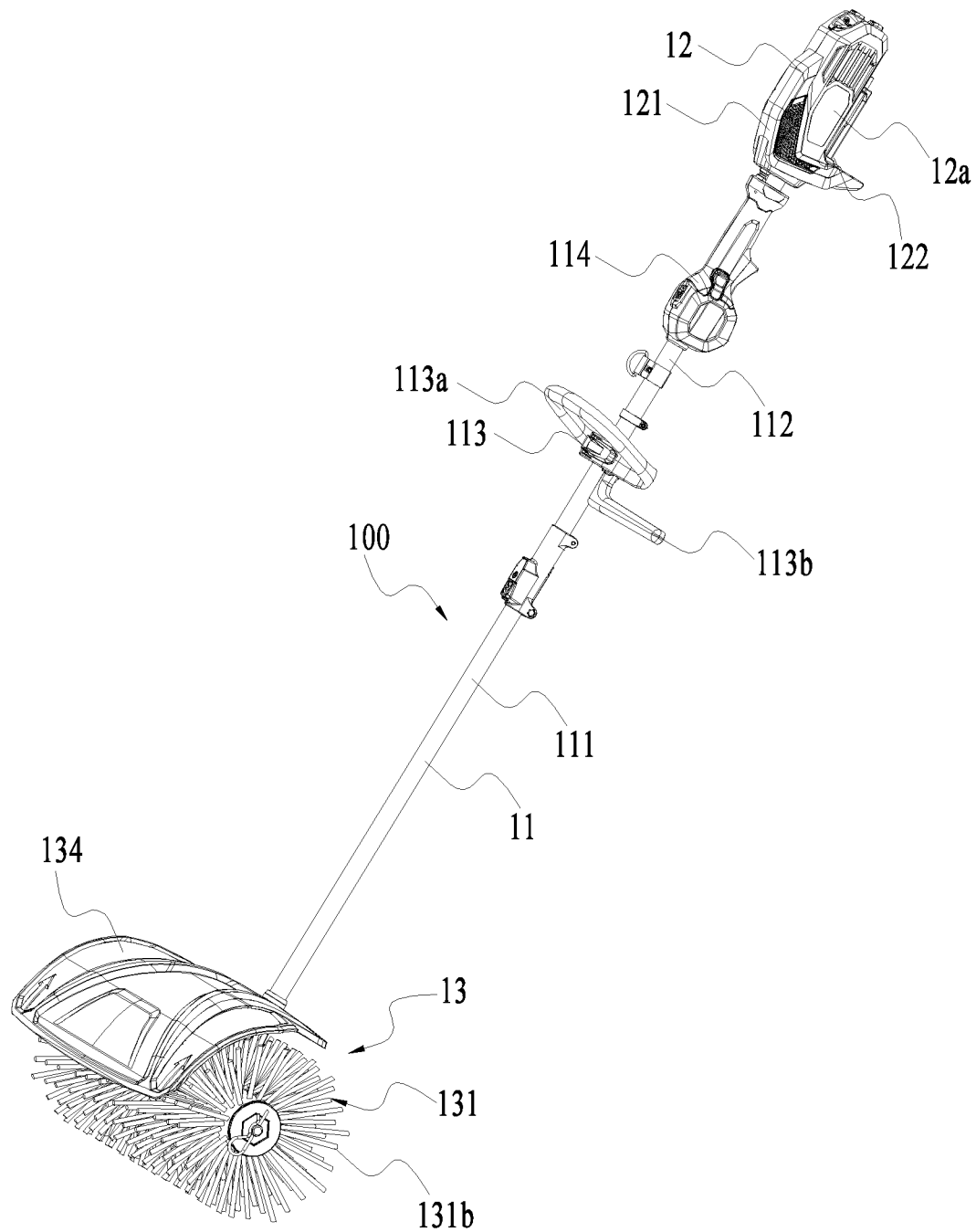
FIG. 1 is a perspective view of a hand-held sweeper according to an example.
Figure 2:
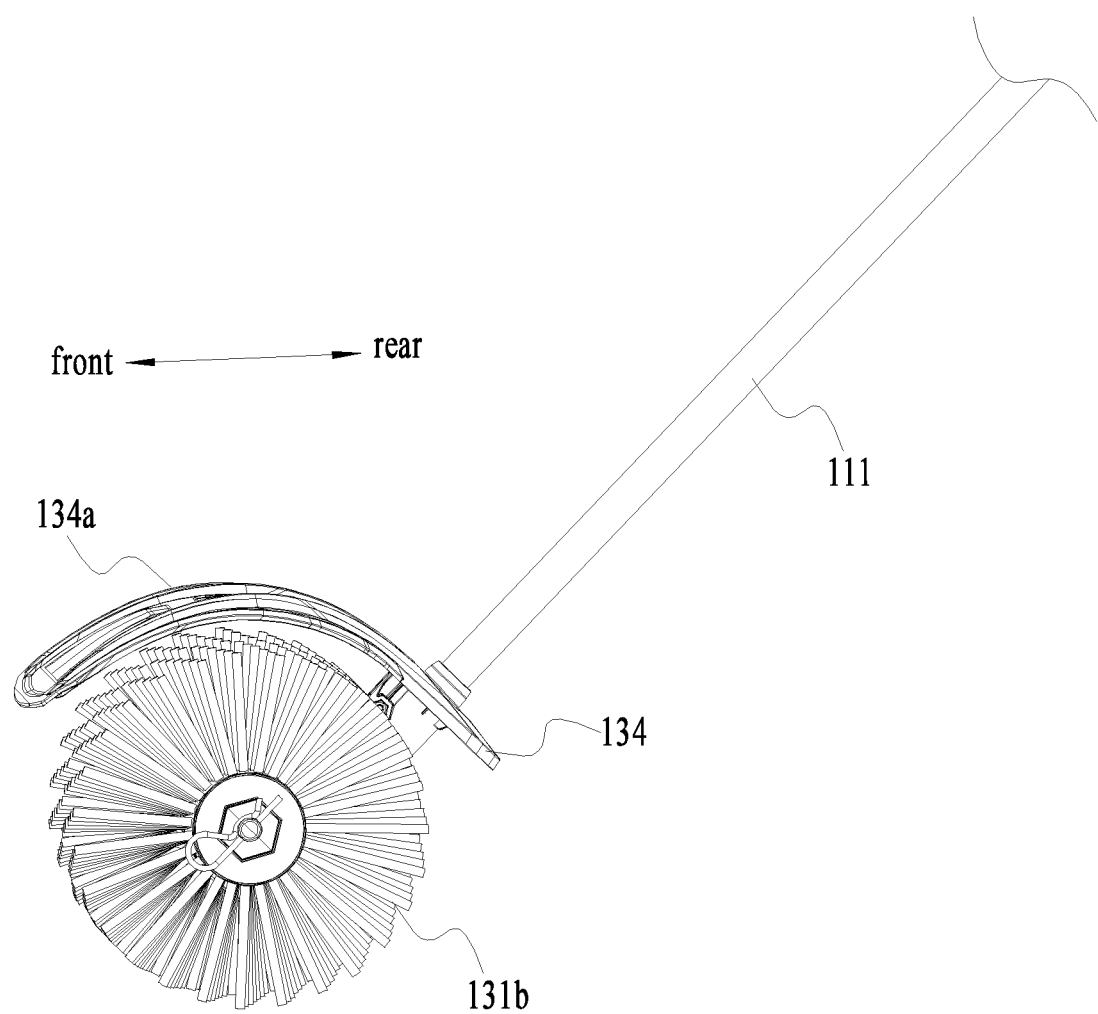
FIG. 2 is a perspective view of a sweeper head of the hand-held sweeper of FIG. 1.
Figure 3:
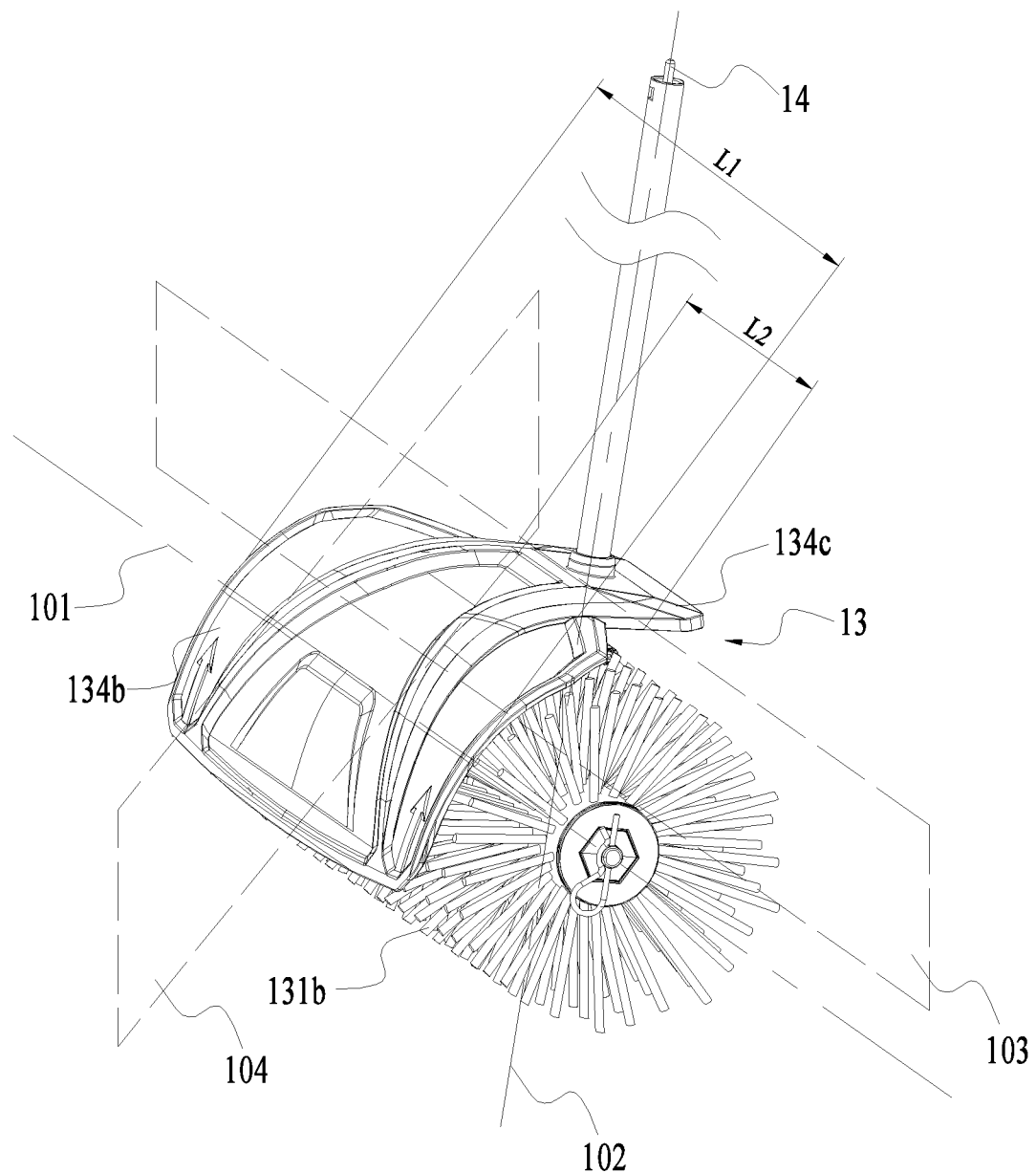
FIG. 3 is a perspective view taken at another angle to illustrate the sweeper head of FIG. 2.
Figure 4:
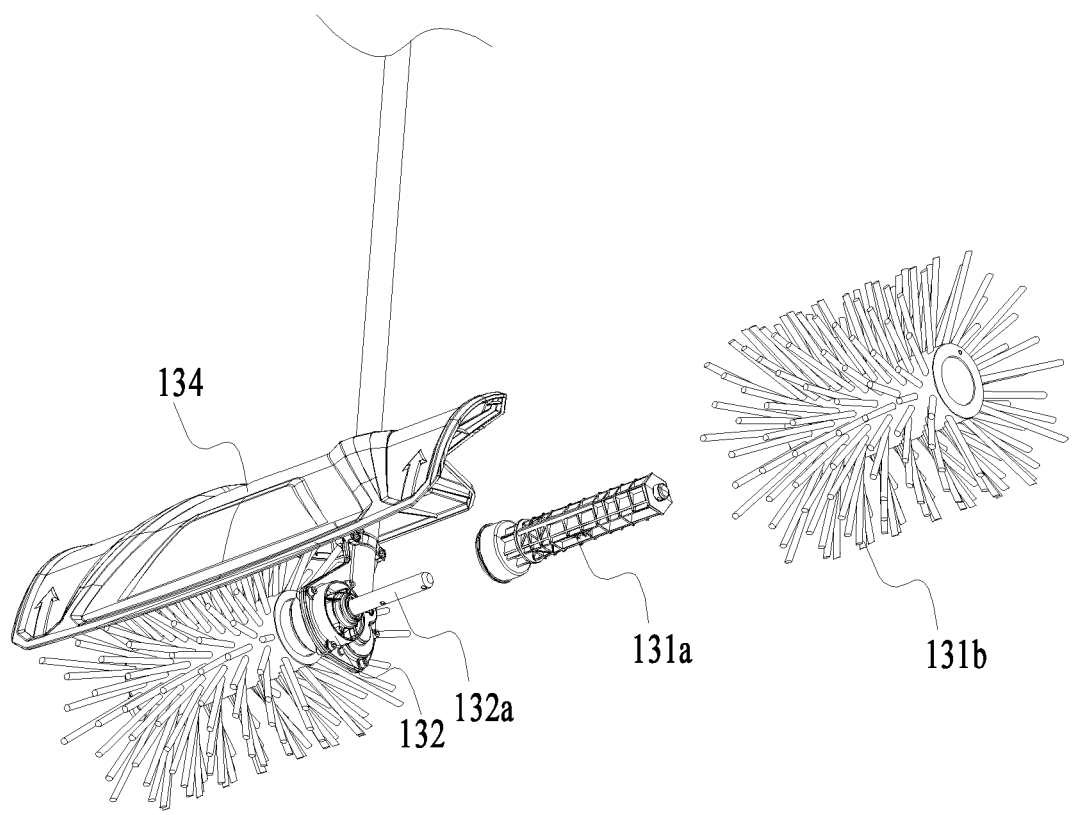
FIG. 4 is an exploded view of the sweeper head of FIG. 3.
Figure 5:
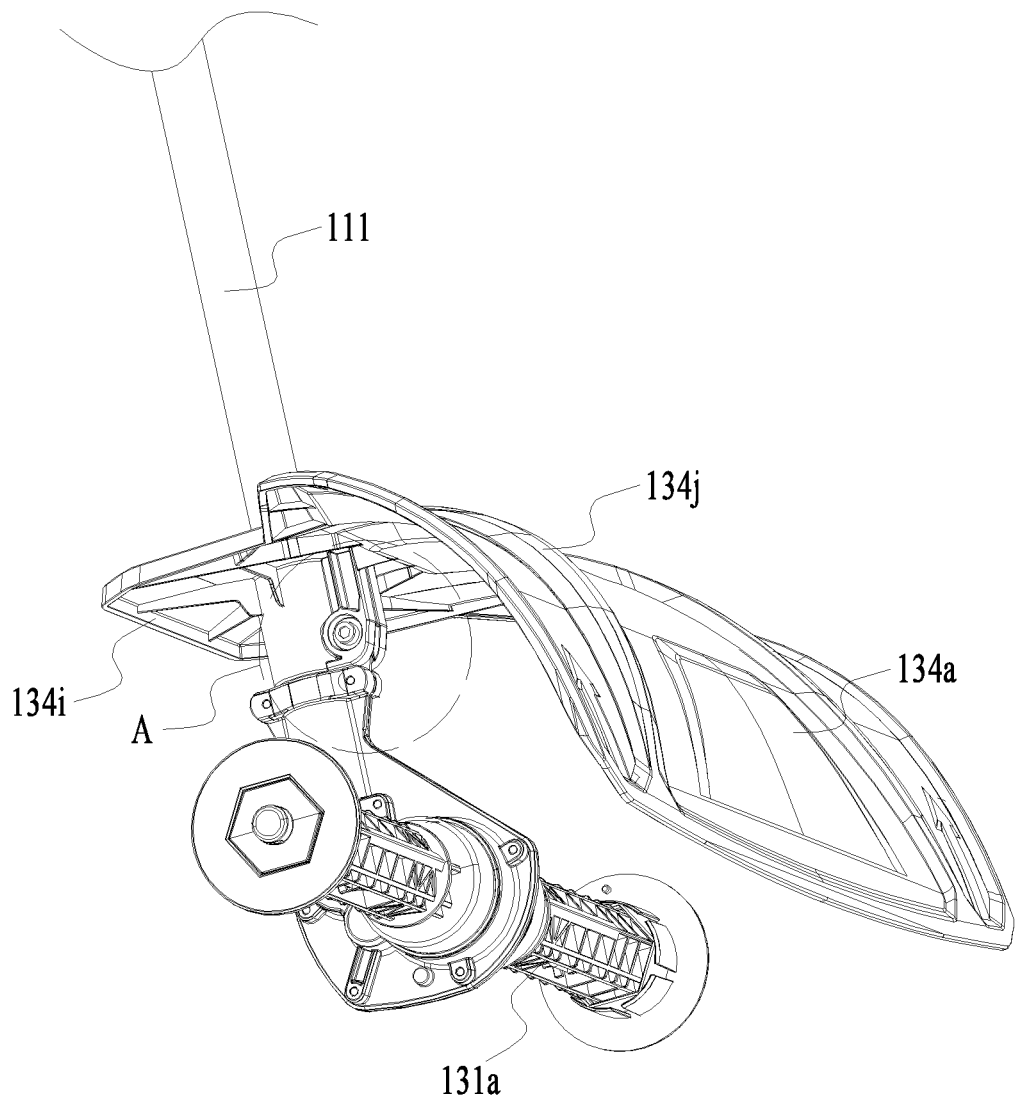
FIG. 5 is a perspective view of the sweeper head of FIG. 4 without a cleaning device.
Figure 6:
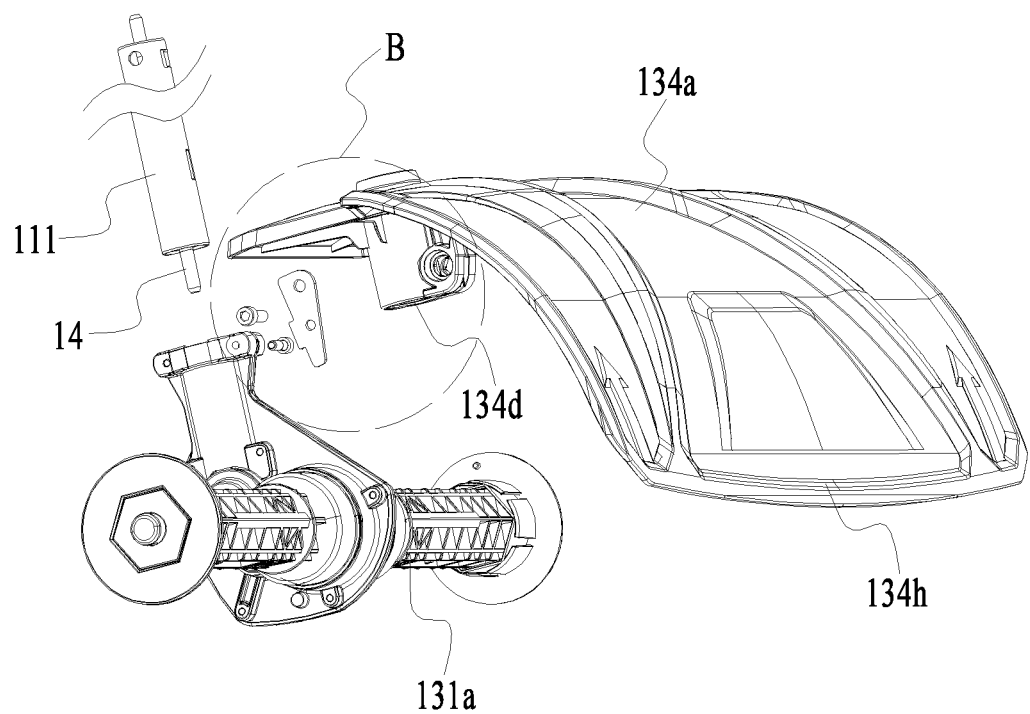
FIG. 6 is an exploded view of the sweeper head of FIG. 5 without the cleaning device.
Figure 7:
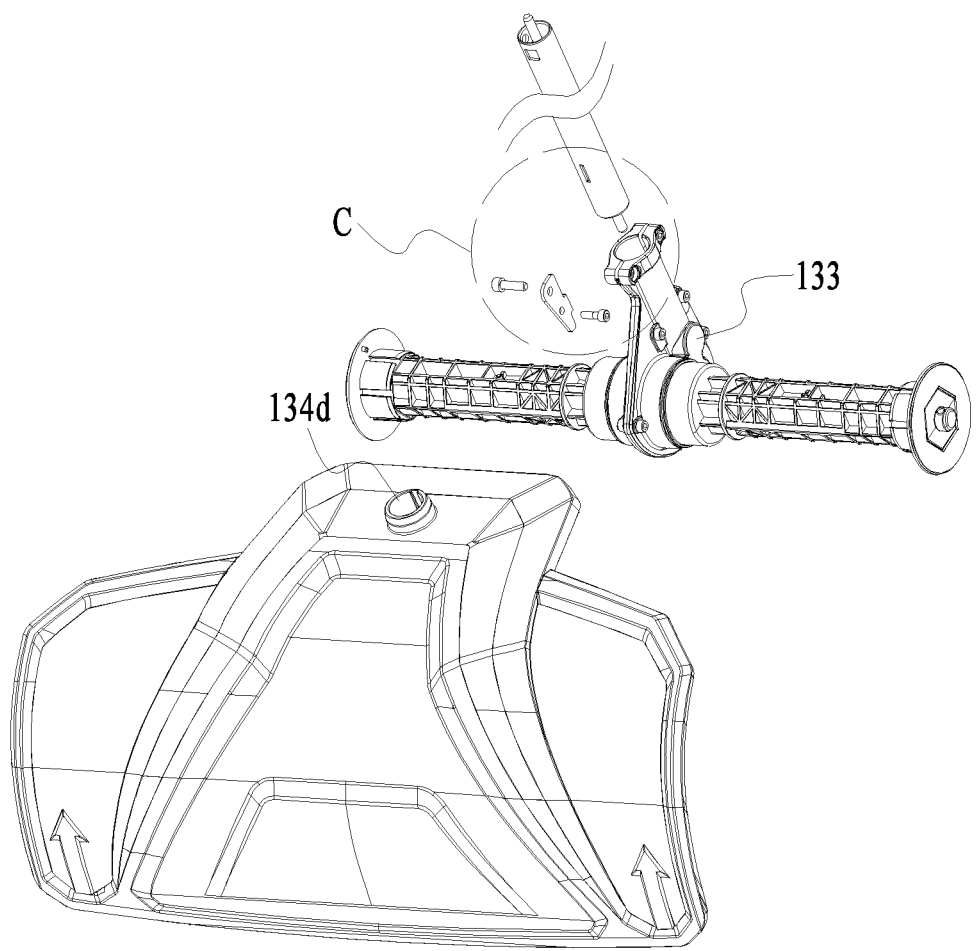
FIG. 7 is an exploded view taken at another angle to illustrate the sweeper head of FIG. 6 without the cleaning device.
Figure 8:
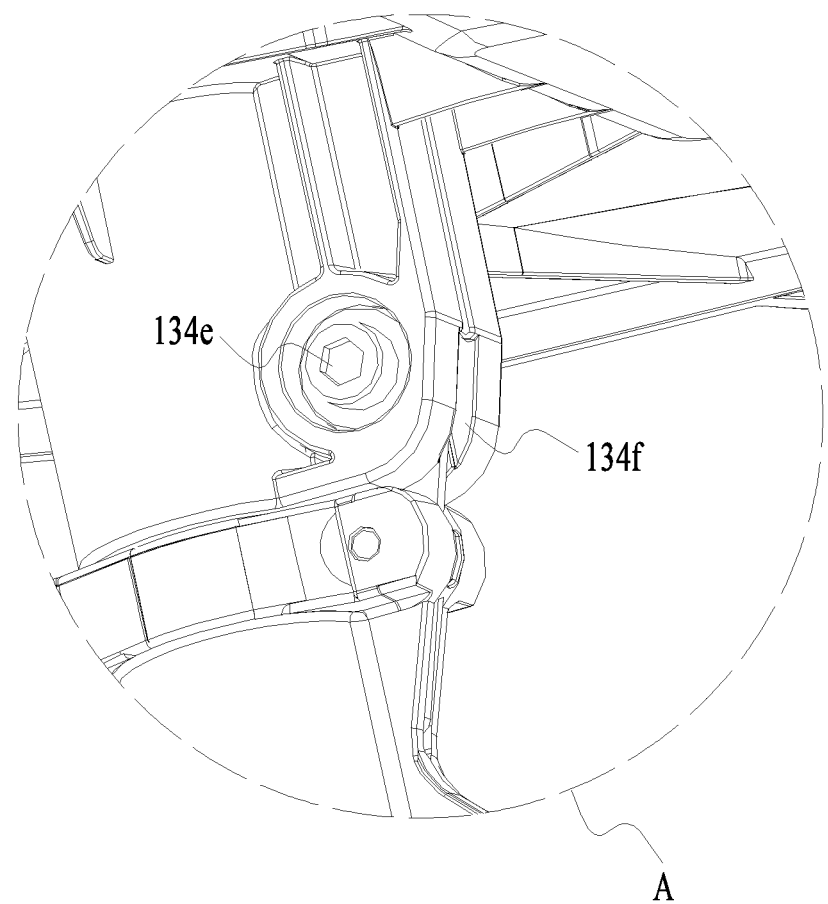
FIG. 8 is an enlarged view illustrating the structure of part A of FIG. 5.
Figure 9:
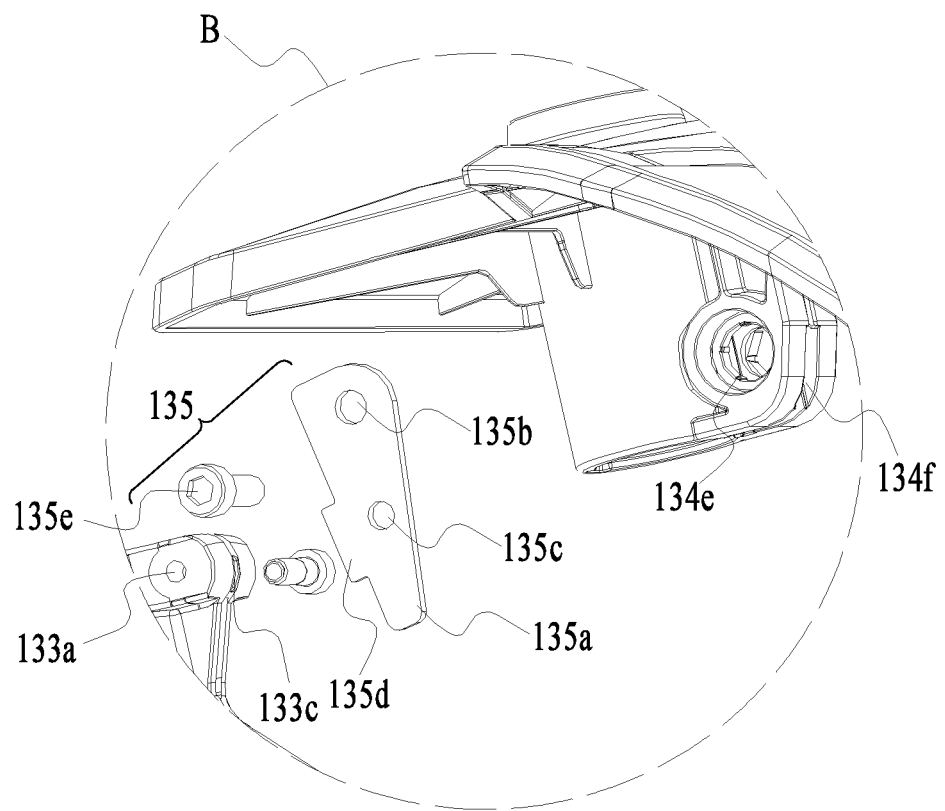
FIG. 9 is an enlarged view illustrating the structure of part B of FIG. 6.
Figure 10:
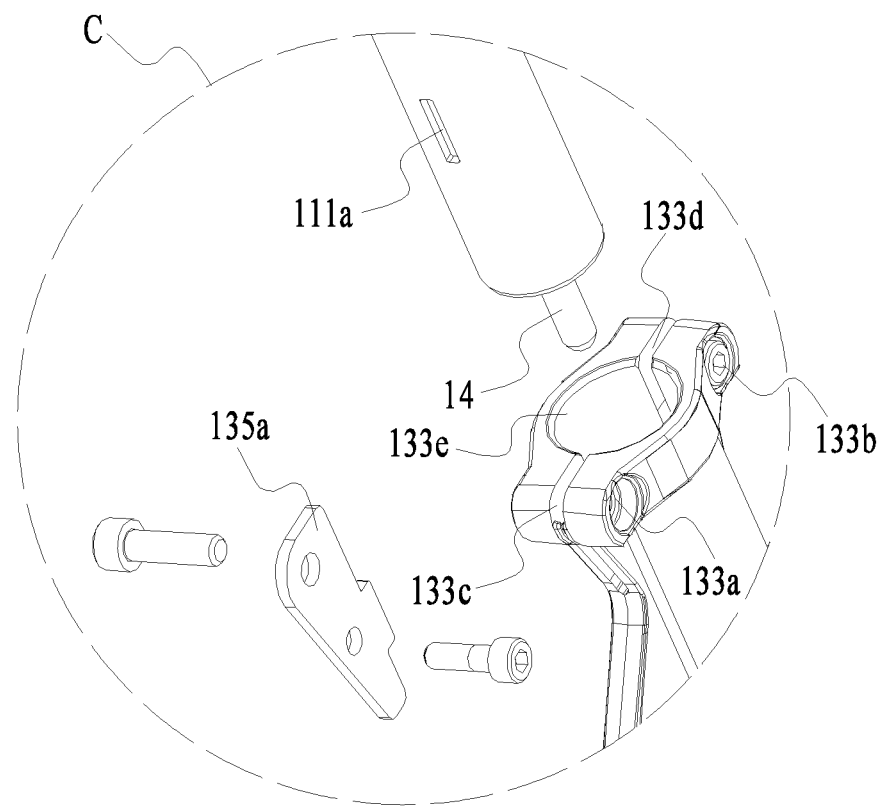
FIG. 10 is an enlarged view illustrating the structure of part C of FIG. 7.

Referring to FIG. 1 to FIG. 3, a hand-held sweeper 100 includes a connecting rod 11, a power head 12, and a sweeper head 13. The connecting rod 11 is for connecting the power head 12 and the sweeper head 13. The power head 12 and the sweeper head 13 may be arranged on two sides of the connecting rod 11. Power is transmitted through a transmission shaft 14 arranged in the connecting rod 11 to drive the sweeper head 13. In fact, the power head 12 and the sweeper head 13 may be arranged at the same end of the connecting rod 11 so that the power head 12 can drive the sweeper head 13 directly. The power head 12 may include a motor. To meet the requirements of power output by the sweeper head 13, output power of the motor is greater than 1000 W. In this example, the connecting rod 11 includes a first connecting rod 111 connected to the sweeper head 13 and a second connecting rod 112 connected to the power head 12. A transmission shaft 14 is disposed in each of the first connecting rod 111 and the second connecting rod 112. The transmission shafts 14 are connected to each other through a coupler. Power can be transmitted between the transmission shafts 14 through the coupler. The second connecting rod 112 of the connecting rod 11 is provided with a handle assembly 113 for a user to hold and a control assembly 114 for controlling the hand-held sweeper 100. In this example, the handle assembly 113 includes a first holding portion 113a and second holding portion 113b. At least a part of the first holding portion 113a surrounds the connecting rod 11 to form a ring for carrying. The second holding portion 113b is away from the first holding portion 113a. The second holding portion 113b extends out in a direction substantially perpendicular to the connecting rod 11 so as to be held by a user. Different holding modes provided by the first holding portion 113a and the second holding portion 113b cause the hand-held sweeper 100 to have at least two operating modes.

The power head 12 includes a motor housing 121 and a motor 12a. The motor housing 121 is formed with an accommodating space for accommodating the motor 12a and a joint portion 122 for installation of a battery pack. The second connecting rod 112 is connected to the motor housing 121. The motor 12a outputs power through an outputting shaft. The outputting shaft is connected to the transmission shaft 14 and transmits power through the transmission shaft 14.

Referring to FIG. 1 to FIG. 7, the sweeper head 13 includes a cleaning device 131, a retarding mechanism 132, a housing 133, and a shield 134. The first connecting rod 111 and the sweeper head 13 are fixedly connected or integrally formed, in fact, the first connecting rod 111 can be regarded as a part of the sweeper head 13. The cleaning device 131 includes a rolling member 131a rotatable about a first axis, and a cleaning element 131b installed on the rolling member 131a. The connecting rod 111 and the housing 133 are connected. The transmission shaft 14 in the first connecting rod 111 transmits power from the transmission shaft 14 in the second connecting rod 112 to the sweeper head 13 through the coupler, the transmission shafts 14 are rotatable about the second axis, and can drive the cleaning device 131 to rotate about the first axis. In fact, the transmission shaft 14 and the retarding mechanism 132 are connected, the retarding mechanism 132 further includes a drive shaft 132a, where the drive shaft 132a is for installation of the rolling member 131a and can drive the rolling member 131a to rotate about the first axis. A first accommodating space is formed in the housing 133, where the first accommodating space is for accommodating at least a part of the retarding mechanism 132. A surrounding portion 134a is formed on the shield 134, where the surrounding portion 134a is for surrounding at least a part of the cleaning element 131b so that sundries are prevented from being driven to fly and harm users by rotation of the cleaning element 131b during users operating the sweeper.

Referring to FIG. 5 to FIG. 10, the sweeper head 13 further includes an installation assembly 135 for installation of the shield 134 to the housing 133 or to the first connecting rod 111. The installation assembly 135 further includes a restricting member 135a for restricting rotation of the shield 134 with respect to the first connecting rod 111. Specifically, the shield 134 includes a first connecting portion, where the first connecting portion can cooperate with the installation assembly 135 for installation of the shield 134 to the housing 133 or to the first connecting rod 111.

In this example, the first connecting portion includes a mounting hole 134d extending through the first connecting portion in a direction along the second axis 102. A first connecting hole 134e is formed perpendicular to the mounting hole 134d. A first accommodating groove 134f into which the restricting member 135a can be inserted, is formed along a direction where the mounting hole 134d extends along. The mounting hole 134d extends through the first accommodating groove 134f. The first connecting portion has elastic force itself, when the fastener 135e is connected to the first connecting hole 134e, it can tighten the first accommodating groove 134f to fix the shield 134 to the housing 133 or the first connecting rod 111. The restricting member 135a extends substantially in a direction along the second axis 102. The restricting member 135a has a first fixing hole 135b and a second fixing hole 135c. The first fixing hole 135b is for matching with a first connecting hole 134e for connecting with the shield 134, and the second fixing hole 135c is for fixing the restricting member 135a itself. In a direction perpendicular to both the first axis 101 and the second axis 102, a stopper 135d is formed on the restricting member 135a. Specifically, the stopper 135d is a bulge protruding from the restricting member 135a in a direction, where the restricting member 135a extends in the direction. A location hole 111a is formed on the first connecting rod 111 into which the stopper 135d can be inserted, where the location hole 111a extends in a direction parallel to the second axis.

In this example, second connecting holes 133a for connecting with the restricting member 135a are formed on the housing 133. In a first plane 103 which passes through the second axis 102 and is parallel to the first axis 101, third connecting holes 133b are formed symmetrically about the first plane 103 on the housing 133. The third connecting holes 133b have the same size and function with the second connecting holes 133a. In fact, in a direction along the second axis 102, the housing where the second connecting hole 133a is located is provided with a second accommodating groove 133c into which the restricting member 135a can be inserted. The second connecting hole 133a is perpendicular to or intersects the second accommodating groove 133c. The housing where the third connecting holes 133b locates is provided with a third accommodating groove 133d into which the restricting member 135a can be inserted. Each of the third connecting holes 133b is perpendicular to or intersects the third accommodating groove 133d. After the restricting member 135a inserts into the second accommodating groove 133c, the restricting member 135a and the housing 133 are connected to form a whole by matching the second fixing hole 135c and the second connecting hole 133a. Alternatively, after the restricting member 135a inserts into the third accommodating groove 133d, the restricting member 135a and the housing 133 are connected to form a whole by matching the second fixing hole 135c and the third connecting hole 133b. In a direction the second axis 102 extends, a second accommodating space 133e is formed on the housing 133 for the first connecting rod 111 to insert into and to connect. The first accommodating space is partially connected with the second accommodating space 133e.

Specifically, when the stopper 135d of the restricting member 135a inserts into the location hole 111a, both the restricting member 135a and the first connecting rod 111 insert into the second accommodating space 133e of the housing 133. During the first connecting rod 111 inserts into the second accommodating space 133e, the restricting member 135a inserts into the second accommodating groove 133c at the same time. It can be understood that, the first connecting rod 111 and the second accommodating space 133e have a relatively permanent connecting way. After the restricting member 135a inserts into the second accommodating groove 133c, the restricting member 135a is fixed to the second connecting hole 133a by a fastener.

Alternatively, during the first connecting rod 111 inserts into the second accommodating space 133e, the restricting member 135a inserts into the third accommodating groove 133d at the same time, and the restricting member 135a is fixed in the third connecting hole 133b by a fastener. At this time, movement of the connecting rod 111 in a direction along the second axis 102 is restricted; meanwhile the first connecting rod 111 cannot rotate in a direction around the second axis 102. That is, the first connecting rod 111 and the restricting member 135a are fixed to the housing 133 at the same time. After this time, the mounting hole 134d is sleeved on the first connecting portion of the shield 134 on the first connecting rod 111, and a position of the first accommodating groove 134f is aligned with the restricting member 135a. After the restricting member 135a inserts into the first accommodating groove 134f, the shield 134 is fixed on the first connecting rod 111 by passing the fastener 135e through the first fixing hole 135b and the first connecting hole 134e. It can be understood that, the shield 134 can be sleeved on an outer wall of the housing 133 directly, so as to form a detachable connection with the housing 133.

To clearly describe the technical solution of the present invention, referring to FIG. 2, a front and a rear are defined. Referring to FIG. 2, in a front-rear direction, the surrounding portion 134a of the shield 134 includes a front surrounding portion 134b located at a front of the first plane 103 and a rear surrounding portion 134c located at the rear of the first plane 103. A surface area of the front surrounding portion 134b is greater than a surface area of the rear surrounding portion 134c. The rear surrounding portion 134c extends substantially on a plane perpendicular to the second axis 102. Here, a maximum measurement of the front surrounding portion 134b in a direction parallel to the first axis is defined as L1, and a maximum measurement of the rear surrounding portion 134c in the direction parallel to the first axis is defined as L2. The ratio of L1 to L2 is greater than or equal to 2 and is less than or equal to 3. That is, in a direction along the first axis 101, the front surrounding portion 134b is relatively wider, and the rear surrounding portion 134c is relatively narrower. In some preferable examples, the ratio of a maximum measurement L1 of the front surrounding portion 134b in the direction parallel to the first axis to a maximum measurement L2 of the rear surrounding portion 134c in the direction parallel to the first axis, is greater than or equal to 2.2 and is less than or equal to 2.6. By setting the ratio, more tightened connection relationship between the front surrounding portion 134b and the rear surrounding portion 134c can be achieved, and a volume and a mass of the whole shield 134 can be reduced since the surface area of the rear surrounding portion 134c is reduced. The shield 134 has an outer surface 134h close to the cleaning element 131b and facing away from the cleaning element 131, and an inner surface 134i opposite to the outer surface 134h and facing towards the rolling member 131b. A reinforcing rib 134j is integrally formed on the inner surface 131i or the outer surface 131h, where the reinforcing rib 134j extends from the rear surrounding portion 134c to two sides of the front surrounding portion arranged in the direction to the first axis 101. On one hand, the reinforcing rib 134j can enhance structural strength of the shield 134 itself; on the other hand, strength of a connecting part between the front surrounding portion 134b and the rear surrounding portion 134c can be further enhanced so that the production of a fracture on the connecting part between the front surrounding portion 134b and the rear surrounding portion 134c because of narrowness of the rear surrounding portion 134c itself is avoided.

Figure 11:
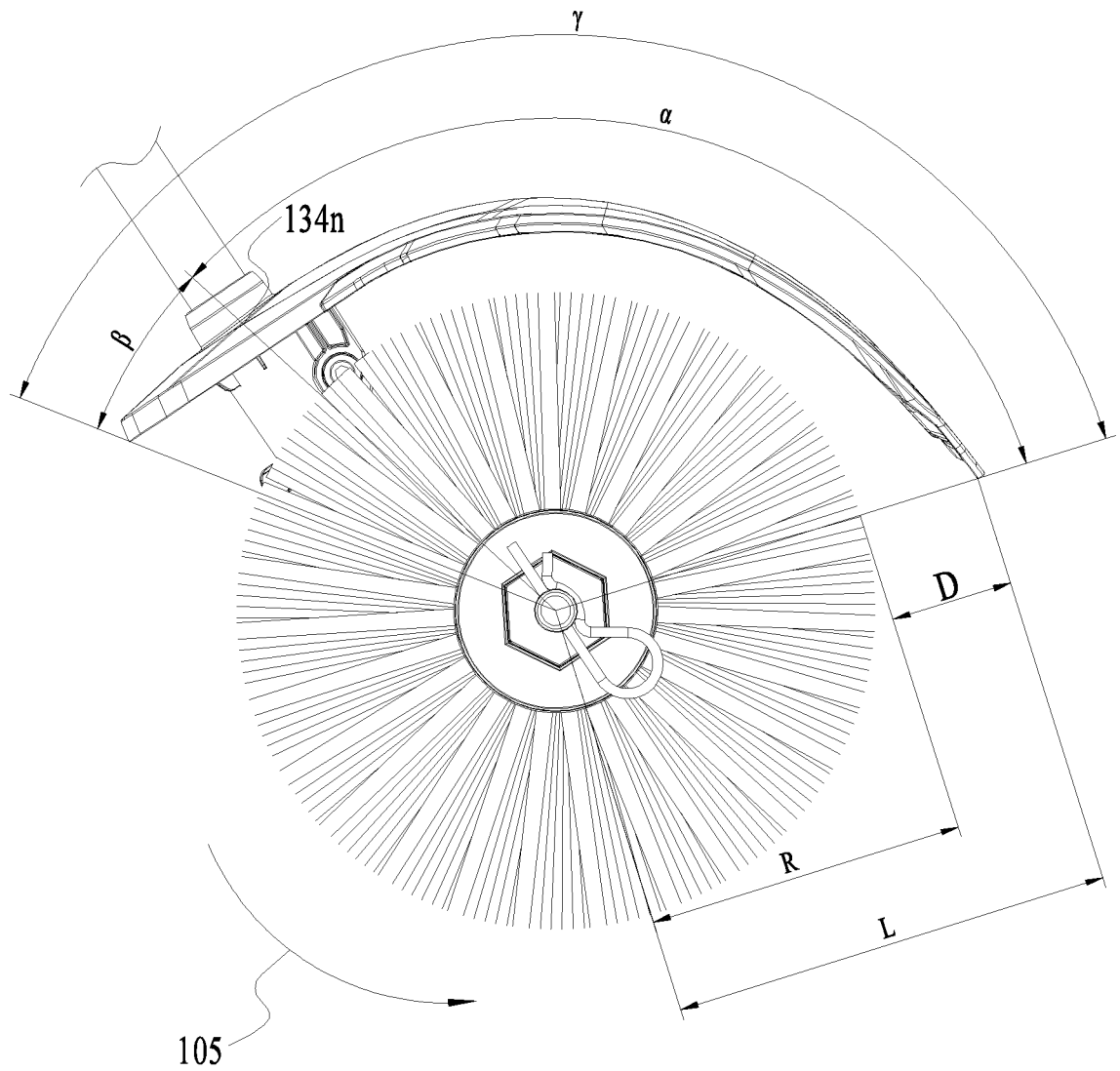
FIG. 11 is a plan view of the sweeper head of FIG. 2 in a first installation state.
Figure 12:
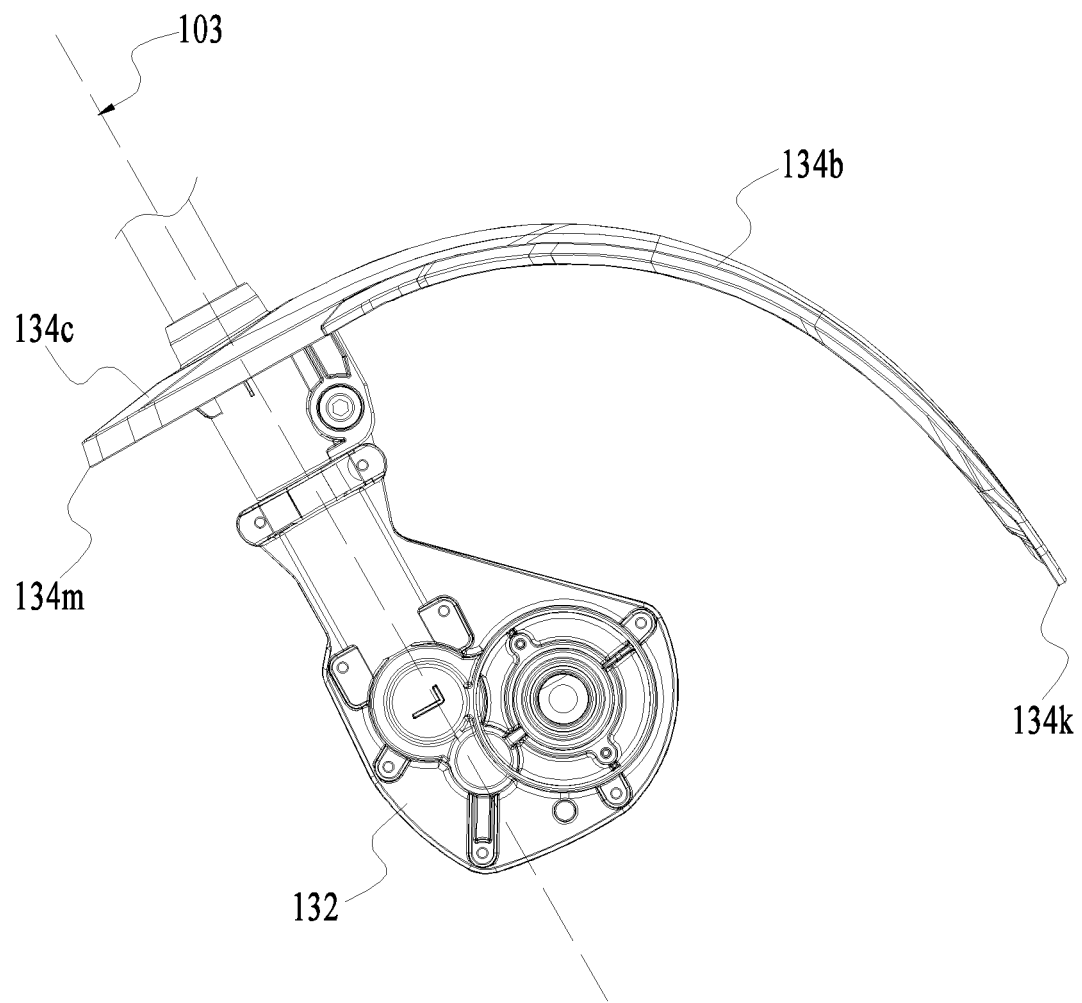
FIG. 12 is a plan view of the sweeper head of FIG. 11 in a second installation state and without the cleaning device.
Figure 13:
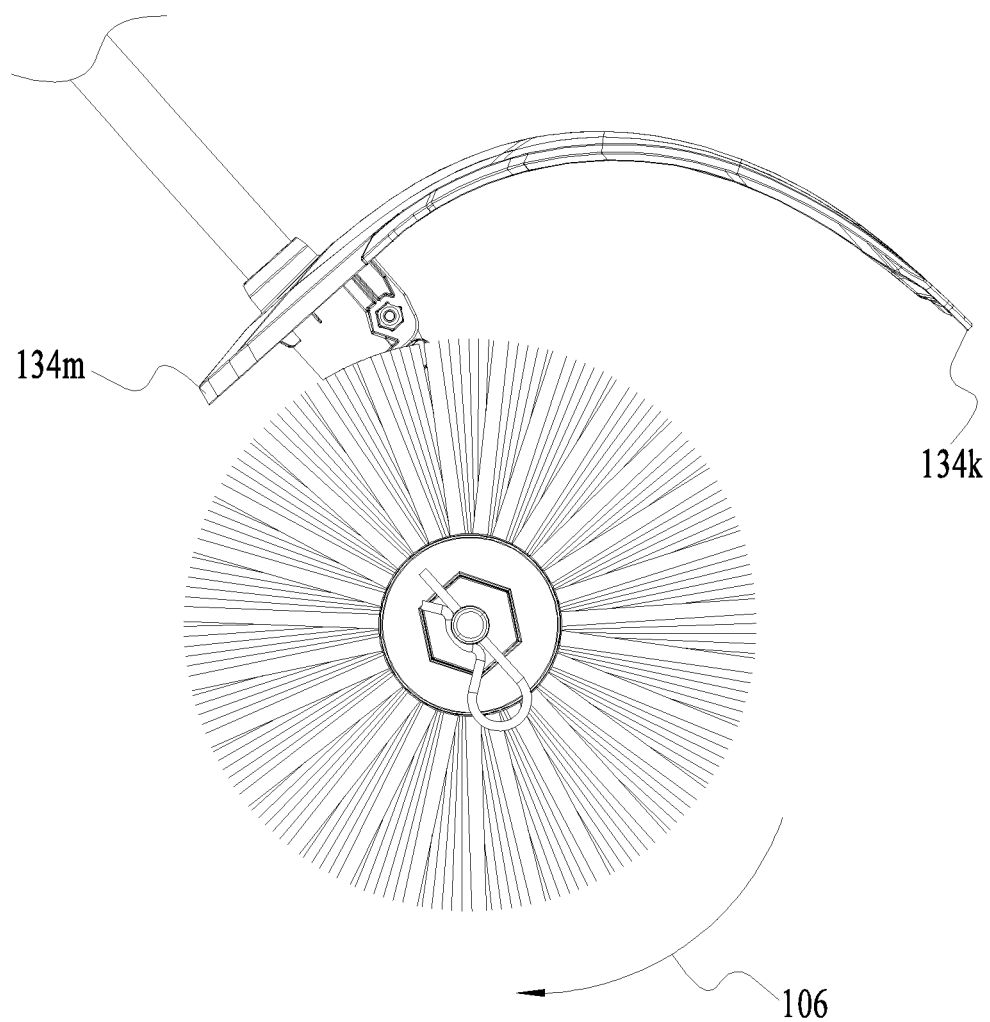
FIG. 13 is a plan view of the sweeper head of FIG. 2 in the second installation state.
Figure 14:
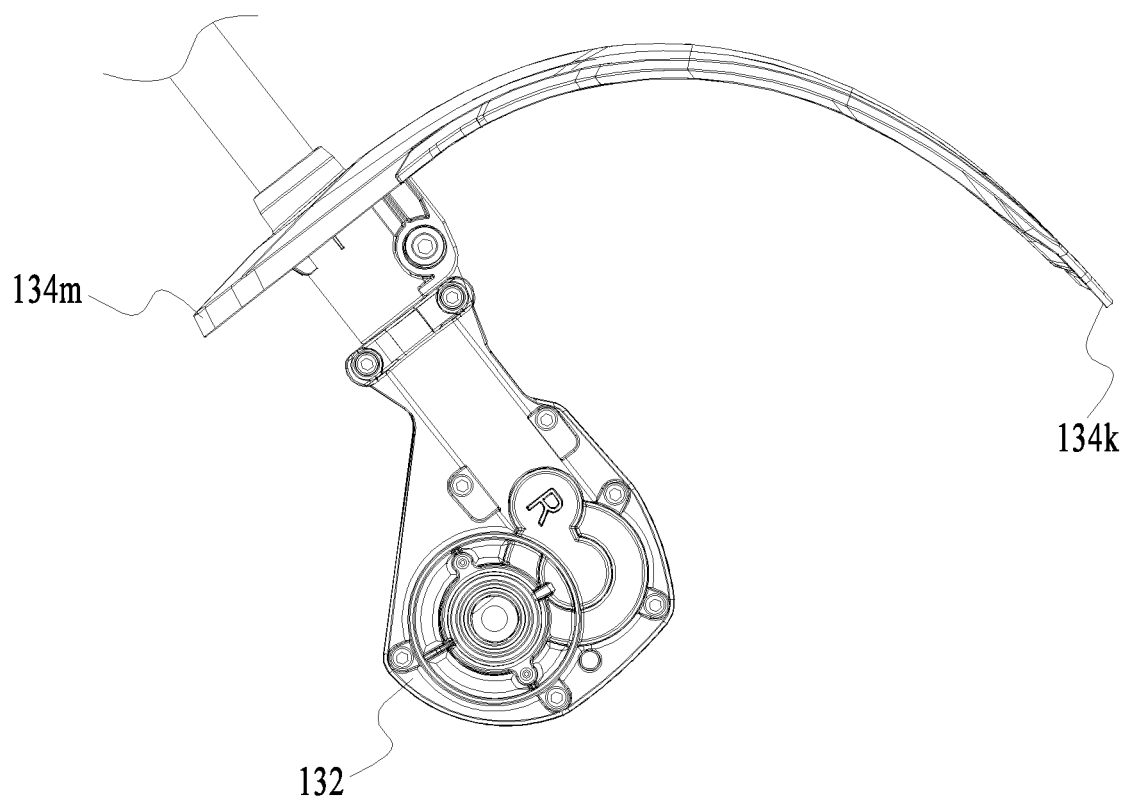
FIG. 14 is a plan view of the sweeper head of FIG. 13 in the second installation state and without the cleaning device.

When the retarding mechanism 132 is connected to the first connecting rod 111 through the installation assembly 135, the retarding mechanism 132 has a first installation state and a second installation state with respect to the first connecting rod 111. Referring to FIG. 11 to FIG. 12, when the retarding mechanism 132 is in the first installation state, the front surrounding portion 134b is located at a front of the first plane 103, the rear surrounding portion 134c is located at the rear of the first plane 103. At this time, retarding mechanism 132 drives the cleaning device 131 to rotate about the first direction 105. Referring to FIG. 13 to FIG. 14, when the retarding mechanism 132 is in the second installation state, the front surrounding portion 134b is located at a rear of the first plane 103, and the rear surrounding portion 134c is located at the front of the first plane 103. At this time, the retarding mechanism 132 drives the cleaning device 131 to rotate about the second direction 106. An angle of rotation from a position of the retarding mechanism 132 with respect to the shield 134 when the retarding mechanism 132 is in the second installation state to a position of the retarding mechanism 132 with respect to the shield 134 when the retarding mechanism 132 is in the first installation state is 180 degrees. It should be noted that, when the retarding mechanism 132 is in the first installation state, the restricting member 135a inserts into the second accommodating groove 133c, and connects with the housing 133 so as to form a whole by matching the second fixing hole 135c and the second connecting hole 133a. When the retarding mechanism 132 is in the second installation state, the restricting member 135a inserts into the third accommodating groove 133d, and connects with the housing 133 so as to form a whole by matching the second fixing hole 135c and the third connecting hole 133b.

A projection of the surrounding portion 134a in a second plane 104 perpendicular to the first axis 101 extends substantially along an arc, where the arc has a first end 134k and a second end 134m. An included angle γ formed by intersection of a connection line between the first end 134k and the first axis 101 and a connection line between the second end 134m and the first axis 101 is greater than or equal to 120 degrees and is less than or equal to 150 degrees. An edge of a projection of the cleaning device 131 in the second plane 104 perpendicular to the first axis 101 is substantially a circle, and a distance between the arc and the circle increases and then decreases. A minimum distance between the front surrounding portion 134a and the cleaning element 131b is greater than or equal to 10 millimeters and is less than or equal to 30 millimeters. In some preferable examples, the minimum distance between the front surrounding portion 134a and the cleaning element 131b is greater than or equal to 15 millimeters and is less than or equal to 30 millimeters.

By setting the distance between the cleaning element 131b and the shield 134, on one hand contact between the cleaning element 131b and the shield 134 when the cleaning element 131b is rotating can be avoided, on the other hand matters such as fallen leaves can be prevented from passing through a gap between the shield 134 and the cleaning element 131b so that impacts on cleaning effects and fragments can be prevented from injuring users as well. Here, a projection point of a center of the mounting hole 134d in a direction perpendicular to the first axis 101 is defined to be an installation point 134n, and a distance between the first end 134k and the installation point 134n is greater than a distance between the second end 134m and the installation point 134n. An included angle α is formed by intersection of a connection line between the first end 134k and the first axis 101 and a connection line between the installation point 134n and the first axis 101, an included angle β is formed by intersection of a connecting line between the second end 134m and the first axis 101 and a connecting line between the installation point 134n and the first axis, and the ratio of the first included angle to the second included angle, is greater than or equal to 5 and is less than or equal to 7.

A distance D obtained by subtracting a radius R of the circle formed by projection of the cleaning device 131 from a distance L between the first end 134k and a center of the circle is greater than or equal to 35 millimeters and is less than or equal to 70 millimeters. In some examples, the distance D obtained by subtracting the radius R of the circle from the distance L between the first end 134k and the center of the circle is greater than or equal to 35 millimeters and is less than or equal to 50 millimeters. By a design above, it is not easy for matters with less mass, such as fallen leaves to pass through the gap between the shield 134 and the cleaning device 131 so that cleaning effects are better.

More specifically, the front surrounding portion 134b is a section of a continuous arc, but to adapt to the requirements of sheltering the cleaning element 131b when in different positions, curvatures of the front surrounding portion 134b in its different positions are different. Therefore, distances between the front surrounding portion 134b and the cleaning element 131b are different. In this example, when the shield 134 is in the first installation state, the minimum distance between the front surrounding portion 134b and the cleaning element 131b is greater than or equal to 10 millimeters. When the shield 134 is in the second installation state, the minimum distance between the front surrounding portion 134b and the cleaning element 131b is greater than or equal to 10 millimeters. The rear surrounding portion 134c is a plane section, where the rear surrounding portion 134c is fixedly connected to the front surrounding portion 134b and is integrally formed with the front surrounding portion 134b, an end of the front surrounding portion 134b facing the first plane 101 extends outwardly.

When the retarding mechanism 132 is in the first installation state, an inner side of the surrounding portion 134a of the shield 134 is not in contact with the cleaning element 131b; when the retarding mechanism 132 is in the second installation state, the inner side of the surrounding portion 134a of the shield 134 is not in contact with the cleaning element 131b. In fact, no matter the retarding mechanism 132 is in which installation state, the shield 134 cannot be in contact with the cleaning element 131b, and does not interfere with the rotation of the cleaning element 131b. In some preferable examples, the surrounding portion 134a of the shield 134 is not in contact with the cleaning element 131b; when the retarding mechanism 132 is in the second installation state, the surrounding portion 134a of the shield 134 is not in contact with the cleaning element 131b. Referring to FIG. 11 to FIG. 12, the cleaning element 131b rotates about the first direction 105, at this time the hand-held sweeper 100 is pushed by users to move forward. During this period, users need to overcome counterforce produced by the cleaning element 131b in a direction of a user's face. When encountering special working conditions, interaction force between the cleaning element 131b and contact surfaces is larger, so that when resistance to push is large and when users continue operating the hand-held sweeper 100 in a way of pushing, the hand-held sweeper 100 cannot be pushed to move or users bear more resistance. At this time, operating modes can be changed, hand-held sweeper 100 should be operated in a way of dragging. When the hand-held sweeper 100 is operated by users in a way of dragging, when the retarding mechanism 132 is in the second installation state, referring to FIG. 13 to FIG. 14, the cleaning element 131b continue rotating about the second direction 106, at this time users drags the hand-held sweeper 100 to move backward. During this period, users need to move in a direction the cleaning element 131b rotates about, furthermore the cleaning element 131b itself has some driving power so that in this operating mode, the hand-held sweeper 100 is more light to operate for users. In fact, no matter operating in a way of pushing or dragging, as long as relatively installation ways of the retarding mechanism 132 is adjusted according to operating modes, the shield 134 can surround at least a part of the cleaning device 131 and keep out of contact with the cleaning element 131b.

Figure 15:
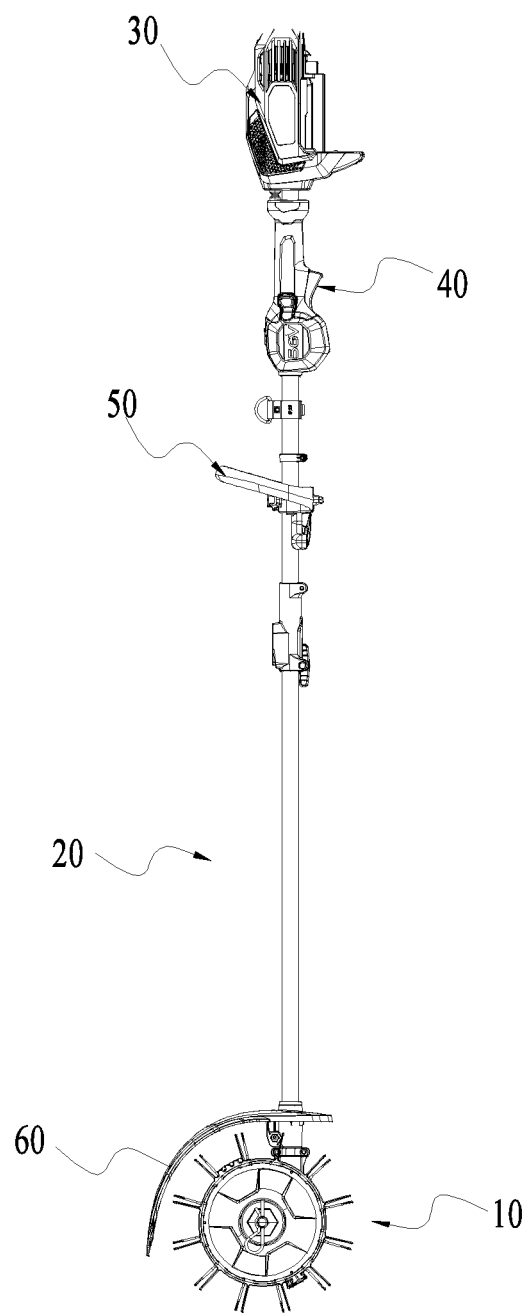
FIG. 15 is a schematic view illustrating the structure of a hand-held sweeper according to another example.
Figure 16:
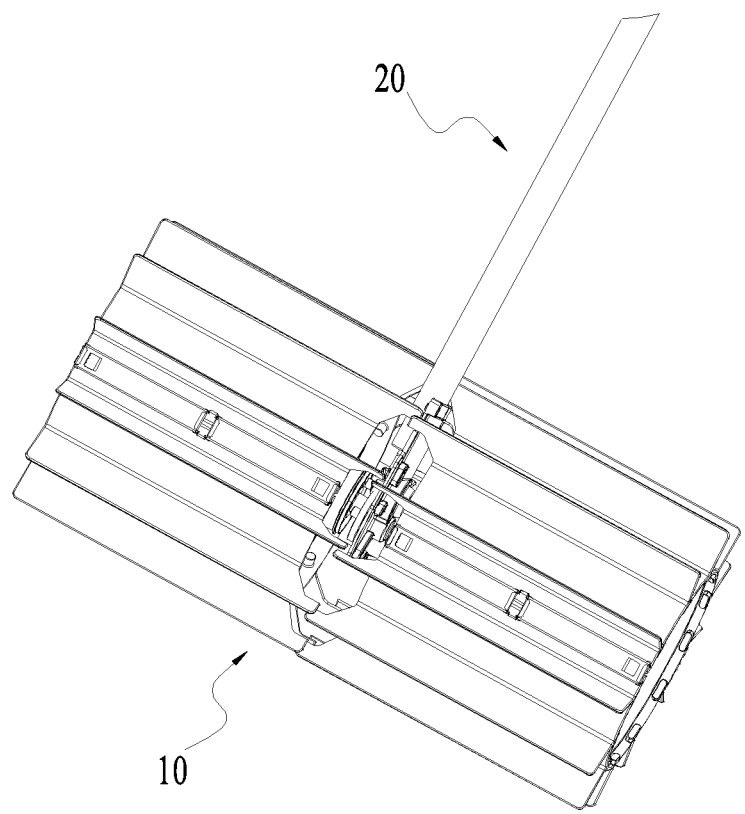
FIG. 16 is a schematic view of partial structures of FIG. 15.
Figure 17:
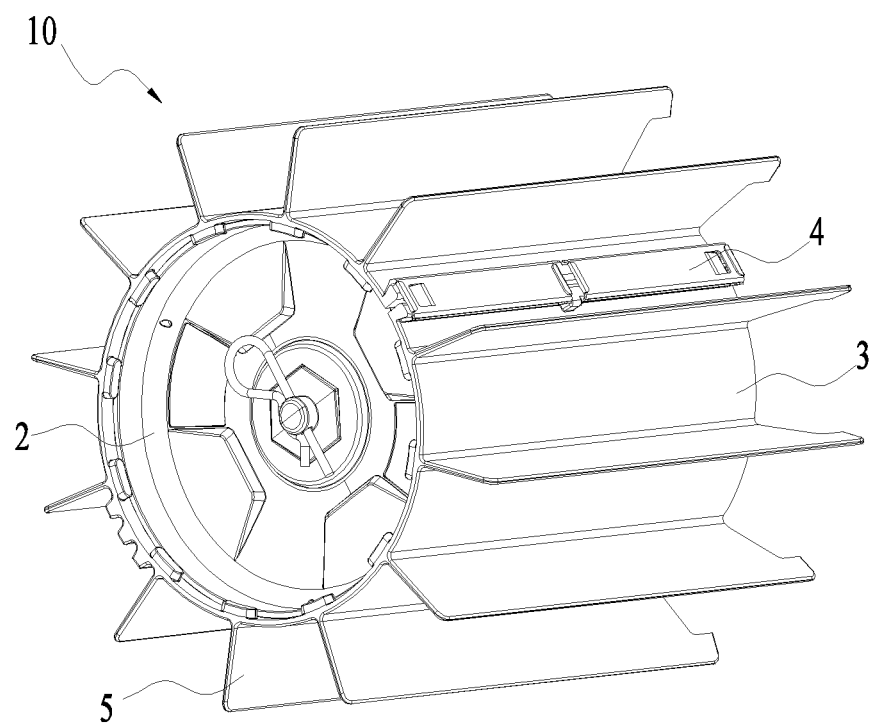
FIG. 17 is a schematic view illustrating the structure of the sweeper head of FIG. 1.

Referring to FIG. 15 and FIG. 16, according to another example of a sweeper, the sweeper is a hand-held sweeper. The sweeper includes a sweeper head 10, and a main handle 20 connected to the sweeper head 10. The main handle 20 is bar-shaped, a power 30 and a control switch 40 are arranged at an end of the main handle 20 away from the sweeper head 10, where the power 30 is a detachable battery pack. A driving mechanism is disposed inside the sweeper head 10, where the driving mechanism is connected to the power 30. The control switch 40 includes at least one of a power switch, a speed regulation switch and a steering switch, and on-off of the driving mechanism can be controlled by the power switch. An auxiliary handle 50 is arranged on the main handle 20 for handling conveniently, a housing shield 60 is provided on the main handle 20, and the sweeper head 10 is partially sheltered by the housing shield 60 on a side of the sweeper head 10.

Referring to FIG. 17 to FIG. 24, the sweeper head 10 includes a transmission shaft 1, a cylinder 2 fixedly connected to the transmission shaft 1, and a sleeve 3 sleeved on the cylinder 2. The transmission shaft 1 is connected to the output end of the driving mechanism, and the driving mechanism is used for driving the transmission shaft 1 to rotate. An opening extending through two ends of the sleeve 3 is disposed on the sleeve 3 along its axial direction, and the sleeve 3 can be removed from the cylinder 2 and can be installed on the cylinder 2 without tools.

When installed, the sleeve 3 is sleeved on the cylinder 2. Since an opening passing through two ends of the sleeve 3 is disposed on the sleeve 3 along the axial direction, sleeving is easy to achieve. Since the sleeve 3 can be removed from the cylinder 2 and can be installed on the cylinder 2 without using tools, convenient, quick and time-saving installation and removal of the sleeve 3 is achieved and the efficiency of replacing the sleeve 3 is improved. Specifically, when removed, the sleeve 3 can be removed by using some existing current auxiliary tools for the purpose of saving time.

The sweeper head 10 further includes a lock catch 4 for fixing between the sleeve 3 and the cylinder 2. In this example, the lock catch 4 is connected to the sleeve 3 so that the sleeve 3 always wraps the cylinder 2 and is substantially fixed with respect to the cylinder 2 along the circumferential direction of the sleeve 3; the lock catch 4 can be installed on the sleeve 3 without using tools.

The edges on two sides of the opening are folded outwardly to form flanges 31. The lock catch 4 is slid and connected to the sleeve 3 along the axial direction. The lock catch 4 is sleeved on the two flanges 31 so that the sleeve 3 wraps the cylinder 2 tightly. When installed, the lock catch 4 is sleeved on the flanges 31 so that the sleeve 3 wraps the cylinder 2 tightly, and the lock catch 4 is slid to a proper position. When removed, as long as the lock catch 4 is slid until the lock catch 4 is disengaged from the sleeve 3 so that the sleeve 3 is removed from the cylinder 2. That is, tool-free installation is achieved.

The sweeper head 10 further includes a plurality of brushing pieces 5 connected to the sleeve 3. When the transmission shaft 1 rotates, the cylinder 2 rotates synchronously with the transmission shaft 1, and since the lock catch 4 causes the sleeve 3 to abut against the cylinder 2, the sleeve 3 rotates synchronously with the cylinder 2 to drive the brushing pieces 5 to rotate. Each of the brushing pieces 5 extends along a radial direction of the sleeve 3. In this example, the brushing pieces 5 and the sleeve 3 are integrally formed to ensure structural strength. After a relatively large number of brushing pieces 5 are worn, the sleeve 3 may be removed and replaced. Here, materials of the sleeve 3 and the brushing pieces 5 are not limited and can be set according to actual demands.

A notch 32 is disposed on each of the flanges 31, and a reverse buckle 41 that can be buckled to the notch 32 is disposed on the lock catch 4. When installed, the lock catch 4 is sleeved on the flanges 31, the lock catch 4 is slid to a position where the reverse buckle 41 is aligned with the notch 32, and the reverse buckle 41 is pressed and inserted into the notch 32, so that the reverse buckle 41 is inserted and connected to the notch 32. Since the lock catch 4 is buckled to and matched with the flange 31, convenient, quick and time-saving removal of the sleeve 3 is achieved and the efficiency of replacing the sleeve 3 is improved.

A protrusion 33 is disposed on a side of the flange 31. When an end of the lock catch 4 abuts against the protrusion 33, the reverse buckle 41 can be pressed and inserted into the notch 32. That is, when the lock catch 4 is slid along the flange 31 until the lock catch 4 abuts against the protrusion 33, the reverse buckle 41 is aligned with the notch 32. When the reverse buckle 41 is aligned with the notch 32, the reverse buckle 41 can be pressed so as to be inserted into the notch 32. The protrusion 33 makes it easy to position the lock catch 4 and thus makes it more convenient and quicker to install the lock catch 4.

Figure 18:
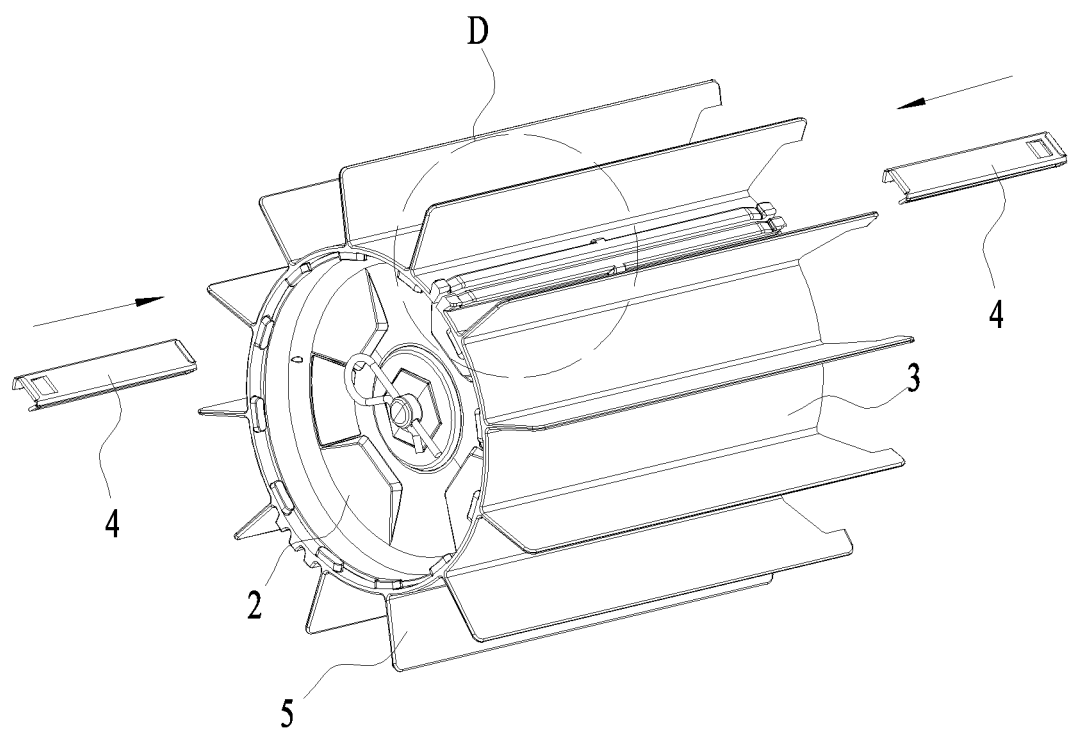
FIG. 18 is a schematic exploded view of partial structures of FIG. 17.
Figure 19:
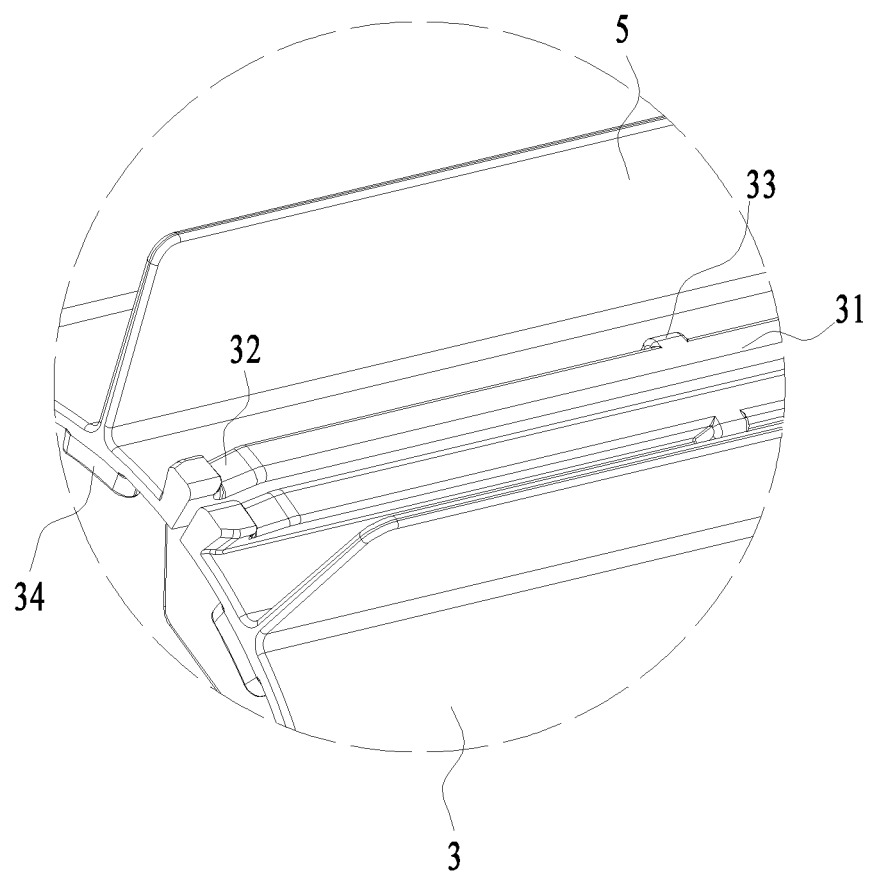
FIG. 19 is an enlarged view of part D of FIG. 18.

If the lock catch 4 is sleeved on the flanges 31, installation and removal are not easy when the lock catch 4 is relatively long, and the area of contact between the lock catch 4 and the flange 31 is small when the lock catch 4 is relatively short. The small area of contact may cause the flange 31 in use to be easily bent. In this example, each of the sleeves 3 is provided with two lock catches 4, and two sides of each of the lock catches 4 abut against the protrusion 33 on two sides of the protrusion 33. When installed, the two lock catches 4 are sleeved on the flanges 31 at two ends of the sleeve 3 and are slid until the lock catches 4 abut against the protrusion 33. Referring to FIG. 18, a direction in which each lock catch 4 is installed is shown by an arrow. When removed, each lock catch 4 is slid in a direction away from the protrusion 33. The arrangement of the two lock catches 4 facilitates installation and removal, reduces the length of each lock catch 4, and causes the flanges 31 to be in full contact with the lock catches 4.

The lock catch 4 is a piece of hardware. The cross section of the lock catch 4 is in the shape of an isosceles trapezoid. The outer side surface of the flange 31 is in touch with the inner side surface of the lock catch 4 by slantwise surfaces. In this manner, matching between the lock catch 4 and the flange 31 is in the shape of a dovetail groove so that the lock catch 4 is prevented from disengaging from the flange 31 along the radial direction of the sleeve 3.

The ratio of the total length of the two lock catches 4 along the axial direction to the total length of the sleeves 3 along the axial direction is greater than or equal to 0.7 and is less than or equal to 1. Furthermore, the ratio of the total length of the two lock catches 4 along the axial direction to the total length of the sleeves 3 along the axial direction is greater than or equal to 0.85 and is less than or equal to 0.95. In this example, the lock catch 4 is sleeved on the flanges 31 along the axial direction so that the sleeve 3 wraps the cylinder 2 tightly. Tightness of engaging between the sleeve 3 and the cylinder 2 is decided by the length of the two lock catches 4 engaging with the sleeves 3 along the axial direction. In this example, the total length of the flanges 31 along the axial direction is approximately equal to the total length of the two lock catches 4 along the axial direction. It should be noted that the number of the lock catch 4, the number of the flange 31, and the number of the sleeve 3 are each not limited to one.

Stoppers 34 are disposed on the inner side of the sleeve 3 and at the two ends of the sleeve 3, and the ends of the cylinder 2 can abut against the stoppers 34. Since the opening is disposed on the sleeve 3, when installed, the sleeve 3 on the two sides of the opening is pulled by an external force so that the sleeve 3 is opened so as to be easily sleeved on the cylinder 2. The external force is removed after the sleeving is completed, so that the cylinder 2 is located between the stoppers 34 at the two ends of the sleeve 3 and thus the sleeve 3 is positioned in its axial direction. When the sleeve 3 slides along its axial direction, the ends of the cylinder 2 can abut against the stoppers 34, so that the sleeve 3 is prevented from disengaging form the cylinder 2. Here, the shapes of the stoppers 34 are not limited as long as the stoppers 34 protrude from the inner wall of the sleeve 3. In this example, the stoppers 34 are in two shapes: block and column.

A reinforcing rib 35 is disposed in a position on the sleeve 3 opposite to the flange 31. Since the opening is disposed, the sleeve 3 can be pulled outwardly, and a position opposite to the flange 31 is subjected to a bending force. Disposing the reinforcing rib 35 is beneficial for improving structural strength.

The transmission shaft 1 includes a body portion, and a connecting portion located on an end of the body portion. The connecting portion is for connecting with the driving mechanism, a ring-shaped flange 11 is disposed on the body portion of the transmission shaft 1, a spring pin 6 is detachably disposed at an end of the transmission shaft 1 away from the connecting portion, an end of the cylinder 2 abut against the ring-shaped flange 11, and the other end of the cylinder 2 abuts against the spring pin 6. The ring-shaped flange 11 and the spring pin 6 can position the cylinder 2 in its axial direction.

In order to perform that the cylinder 2 can rotate with the transmission shaft 1, the cylinder 2 can be arranged to connect to the transmission shaft 1 by a key. In this example, the transmission shaft 1 is in a shape of a regular hexagonal prism, a center hole in a shape of a regular hexagon is disposed in a center of the cylinder 2, so that the cylinder 2 is restricted from moving with respect to the transmission shaft 1 along its circumferential direction.

In this example, the cylinder 2 has a separated structure. The cylinder 2 includes two cylinder sections disposed symmetrically, where the two cylinder sections connect jointly in their axial directions to form the cylinder 2. Specifically, a plurality of convex pieces 21 are spaced apart at an end of the cylinder section in the circumferential direction of the cylinder section, an inserting groove is formed between adjacent convex pieces 21, convex pieces 21 of one cylinder section can insert into the inserting grooves of another cylinder section so that the convex pieces 21 of the two cylinder sections are in touch jointly. Disposing the cylinder sections is beneficial for reducing axial measurements during processing and production.

When assembling the sweeper head 10, the cylinder sections are installed sequentially on the transmission shaft 1 so that the cylinder sections are jointly connected to form the cylinder 2 and an end of the cylinder 2 abuts against the ring-shaped flange 11. The spring pin 6 is installed on the transmission shaft 1 so that the spring pin 6 abuts against the cylinder 2; the sleeve 3 is pulled outwardly and sleeve it on the cylinder 2 so that the cylinder 2 is between the stoppers 34 located at the two ends of the sleeve 3; the lock catch 4 is sleeved on the two flanges 31, the lock catch 4 is slid until the lock catch 4 abuts against the protrusion 33, and the reverse buckle 41 is pressed, so that the reverse buckle 41 inserts into the notch 32 and connecting between the lock catch 4 and the flange 31 by buckling is achieved. During repair and replacement, the sleeve 3 can be removed from the cylinder 2 and replaced as long as the reverse buckle 41 is unwrapped with tools so that the reverse buckle 41 disengages from the notch 32 and the lock catch 4 is slid along the flange 31 so that lock catch 4 disengages from the sleeve 3.

In other examples, the lock catch can be disposed to connect to the cylinder 5 so that the sleeve 3 always wraps the cylinder 2 and is fixed with respect to the cylinder 2 along its circumferential direction. Specifically, threads are disposed on a side of the lock catch, the stopper is disposed at the other end of the lock catch, a threaded hole is disposed on the cylinder 2, and a through hole is disposed in a position on the sleeve 3 opposite to the threaded hole. When installed, the sleeve 3 is sleeved on the cylinder so that the through hole is aligned with the threaded hole, an end of the lock catch is passed through the through hole to connect with the threaded hole, at this time the stopper can abut against the sleeve 3 so that the sleeve 3 is fixed with respect to the cylinder 2.

Figure 20:
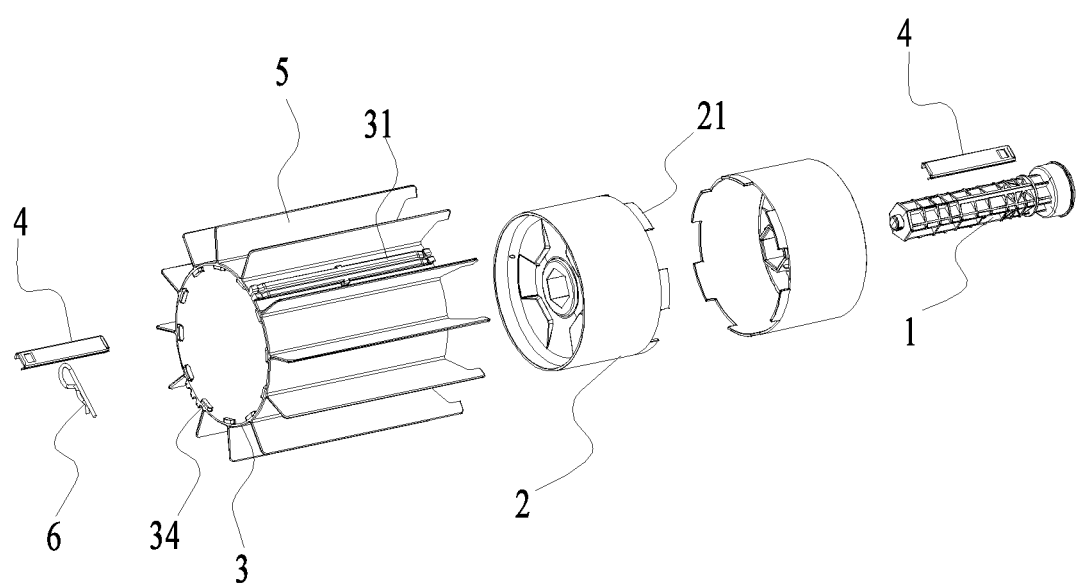
FIG. 20 is an exploded view of structures of FIG. 17.
Figure 21:
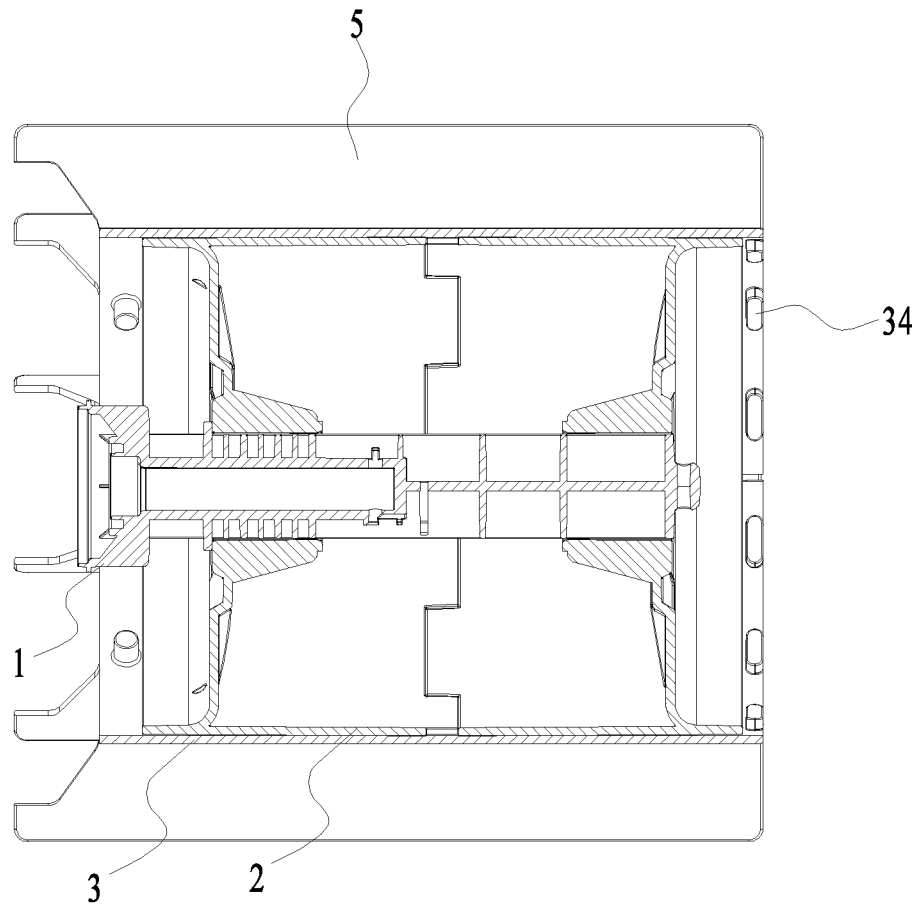
FIG. 21 is a sectional view of structures of FIG. 17.
Figure 22:
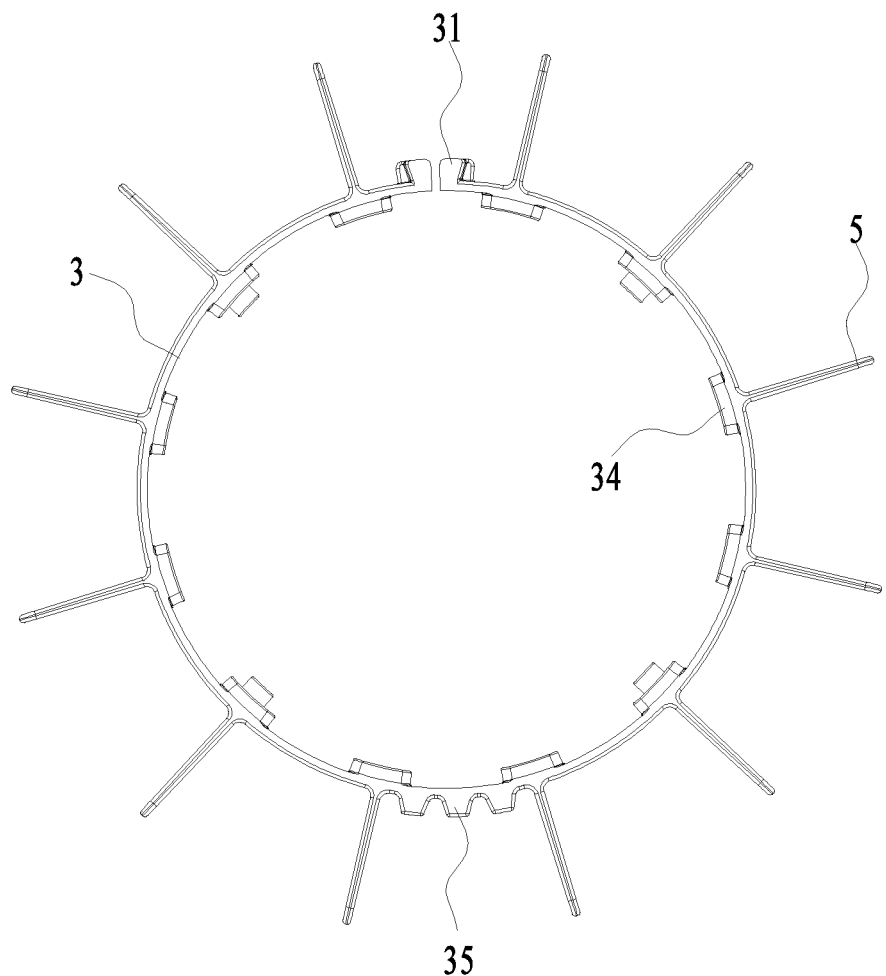
FIG. 22 is a side view of a sleeve and a brushing piece of the sweeper head of FIG. 17.
Figure 23:
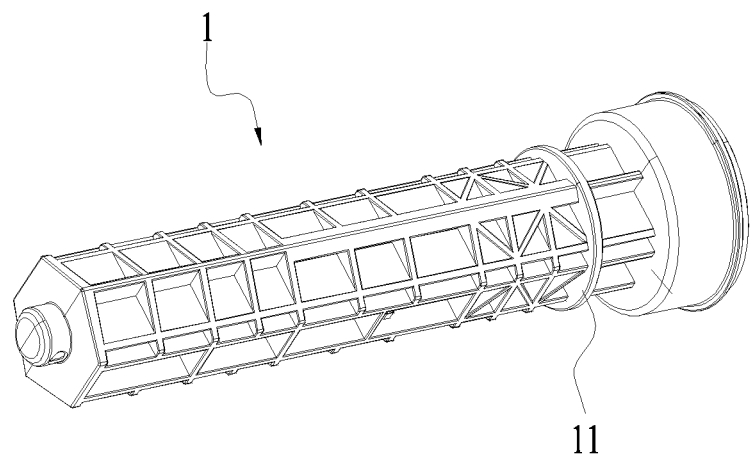
FIG. 23 is a schematic view illustrating the structure of a transmission shaft of the sweeper head of FIG. 17.
Figure 24:
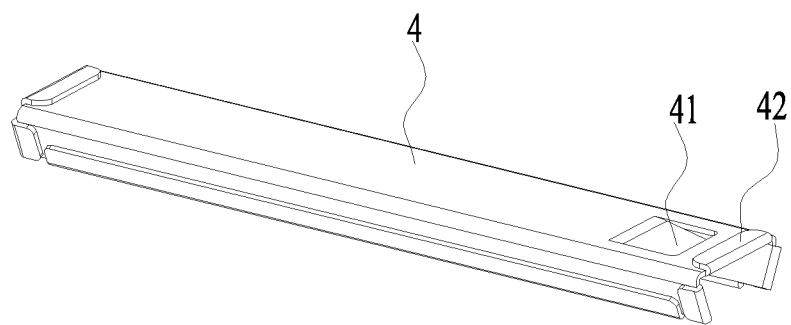
FIG. 24 is a schematic view illustrating the structure of a lock catch of the sweeper head of FIG. 17.

Referring to FIG. 20, a flanging structure 42 is formed on an edge of the lock catch 4 so that when the lock catch 4 is installed on the sleeve 3, the sleeve 3 can be protected from cutting. In this manner, the situation that sharp edges of the flanging structure 42 of the lock catch 4 cuts the sleeve 3, providing that the flanging structure 42 is not disposed, can be avoided. More specifically, the flanging structure 42 is disposed on each of a plurality of the edges of the lock catch 4 so that the sleeve 3 is further prevented from harm.

Basic principles, main features and advantages of the present invention are shown and described above. It should be understood by those skilled in the art that the present invention should not be limited by examples above in any form, and all the technical solutions obtained by equivalent replacement or equivalent transformation fall within the scope of the present invention.

What is claimed is:

1. A sweeper head applicable to a hand-held sweeper, comprising:
a cleaning device comprising a rolling member rotatable about a first axis and a cleaning element installed on the rolling member;
a transmission shaft configured to transmit power to the sweeper head and rotatable about a second axis;
a shield comprising a surrounding portion for surrounding at least a part of the cleaning element; and
a connecting rod, wherein the cleaning device is installed at an end of the connecting rod,
wherein the surrounding portion comprises a front surrounding portion and a rear surrounding portion located on two sides of a first plane, the first plane passes through the second axis and is parallel to the first axis, the rear surrounding portion is sleeved onto the connecting rod, a size of the shield in a direction parallel to the first axis decreases at the juncture of the front surrounding portion and the rear surrounding portion, and a ratio of a maximum measurement L1 of the front surrounding portion in a direction parallel to the first axis to a maximum measurement L2 of the rear surrounding portion in the direction parallel to the first axis is greater than or equal to 2 and is less than or equal to 3.

2. The sweeper head as claimed in claim 1, wherein the front surrounding portion and the rear surrounding portion are integrally formed.

3. The sweeper head as claimed in claim 1, wherein the shield has an inner surface facing the cleaning element and an outer surface opposite to the inner surface, a reinforcing rib is integrally formed on the inner surface or the outer surface, and the reinforcing rib extends from the rear surrounding portion to two sides of the front surrounding portion arranged in the direction parallel to the first axis.

4. The sweeper head as claimed in claim 1, wherein a minimum distance between the surrounding portion and the cleaning element is greater than or equal to 15 millimeters and is less than or equal to 30 millimeters.

5. The sweeper head as claimed in claim 1, wherein the ratio of the maximum measurement L1 of the front surrounding portion in the direction parallel to the first axis to the maximum measurement L2 of the rear surrounding portion in the direction parallel to the first axis is greater than or equal to 2.2 and is less than or equal to 2.6.

6. The sweeper head as claimed in claim 1, wherein a projection of the surrounding portion on a plane perpendicular to the first axis extends substantially along an arc, an edge of a projection of the cleaning device on the plane perpendicular to the first axis is substantially a circle, a point of intersection of the arc and the first plane is defined to be an installation point of the shield, the arc has a first end and a second end, a distance between the first end and the installation point is greater than a distance between the second end and the installation point, and a distance D obtained by subtracting a radius R of the circle from a distance L between the first end and a center of the circle is greater than or equal to 35 millimeters and is less than or equal to 70 millimeters.

7. The sweeper head as claimed in claim 6, wherein the distance D obtained by subtracting the radius R of the circle from the distance L between the first end and the center of the circle is greater than or equal to 35 millimeters and is less than or equal to 50 millimeters.

8. The sweeper head as claimed in claim 1, wherein a projection of the shield on a plane perpendicular to the first axis is substantially an arc, and an included angle formed by intersection of a connection line between one end of the arc and the first axis and a connection line between the other end of the arc and the first axis is greater than or equal to 120 degrees and is less than or equal to 150 degrees.

9. The sweeper head as claimed in claim 1, wherein a projection of the shield on a plane perpendicular to the first axis is substantially an arc, a point of intersection of the arc and the first plane is defined to be an installation point of the shield, the arc has a first end and a second end, a distance between the first end and the installation point is greater than a distance between the second end and the installation point, a first included angle is formed by intersection of a connection line between the first end and the first axis and a connection line between the installation point and the first axis, a second included angle is formed by intersection of a connection line between the second end and the first axis and the connection line between the installation point and the first axis, and a ratio of the first included angle to the second included angle is greater than or equal to 5 and is less than or equal to 7.

10. The sweeper head as claimed in claim 1, further comprising a retarding mechanism configured for power transmission between the transmission shaft and the cleaning device and comprising a drive shaft for driving the cleaning element to rotate, a housing configured to accommodate at least a part of the retarding mechanism and connected to the connecting rod, and
  an installation assembly configured for installation of the shield to the housing or the connecting rod and enabling the retarding mechanism to have a first installation state and a second installation state, wherein, when the retarding mechanism is in the first installation state, a preset gap is provided between an inner side of the surrounding portion and the cleaning element and, when the retarding mechanism is in the second installation state, a preset gap is provided between the inner side of the surrounding portion and a tail end of the cleaning element.

11. The sweeper head as claimed in claim 10, wherein, when the retarding mechanism is in the first installation state, the front surrounding portion is located at a front of the first plane and the rear surrounding portion is located at a rear of the first plane and, when the retarding mechanism is in the second installation state, the front surrounding portion is located at the front of the first plane and the rear surrounding portion is located at the rear of the first plane.

12. The sweeper head as claimed in claim 11, wherein an angle of rotation from a position of the retarding mechanism with respect to the shield when the retarding mechanism is in the second installation state to a position of the retarding mechanism with respect to the shield when the retarding mechanism is in the first installation state is 180 degrees, a surface area of the front surrounding portion is greater than a surface area of the rear surrounding portion, when the retarding mechanism is in the first installation state, a minimum distance between the front surrounding portion and the cleaning element is greater than or equal to 10 millimeters, and, when the retarding mechanism is in the second installation state, the minimum distance between the front surrounding portion and the cleaning element is greater than or equal to 10 millimeters.

13. The sweeper head as claimed in claim 1, wherein the rear surrounding portion extends substantially on a plane perpendicular to the second axis.

14. The sweeper head as claimed in claim 1, wherein a projection of the surrounding portion on a second plane perpendicular to the first axis extends substantially along an arc, an edge of a projection of the cleaning device on the second plane perpendicular to the first axis is substantially a circle, and a distance between the arc and the circle increases and then decreases.

15. A hand-held sweeper, comprising:
  a power head comprising a motor for outputting power;
  a cleaning device comprising a rolling element rotatable about a first axis and a cleaning element installed on the rolling element;
  a transmission shaft configured to transmit power to the power head and rotatable about a second axis;
  a shield comprising a surrounding portion for surrounding at least a part of the cleaning element; and
  a connecting rod, wherein the cleaning device is installed at one end of the connecting rod and the power head is installed at the other end of the connecting rod,
  wherein the surrounding portion comprises a front surrounding portion and a rear surrounding portion located on two sides of a first plane, and the first plane passes through the second axis and is parallel to the first axis, the rear surrounding portion is sleeved onto the connecting rod, a size of the shield in a direction parallel to the first axis decreases at the juncture of the front surrounding portion and the rear surrounding portion, and a ratio of a maximum measurement L1 of the front surrounding portion in a direction parallel to the first axis to a maximum measurement L2 of the rear surrounding portion in the direction parallel to the first axis is greater than or equal to 2 and is less than or equal to 3.

16. The hand-held sweeper as claimed in claim 15, wherein the front surrounding portion and the rear surrounding portion are integrally formed.

17. The hand-held sweeper as claimed in claim 15, wherein a minimum distance between the surrounding portion and the cleaning element is greater than or equal to 15 millimeters and is less than or equal to 30 millimeters.

18. The hand-held sweeper as claimed in claim 15, wherein the ratio of the maximum measurement L1 of the front surrounding portion in the direction parallel to the first axis to the maximum measurement L2 of the rear surrounding portion in the direction parallel to the first axis is greater than or equal to 2.2 and is less than or equal to 2.6.

19. The hand-held sweeper as claimed in claim 15, wherein a projection of the surrounding portion on a plane perpendicular to the first axis extends substantially along an arc, an edge of a projection of the cleaning device on the plane perpendicular to the first axis is substantially a circle, a point of intersection of the arc and the first plane is defined to be an installation point of the shield, the arc has a first end and a second end, a distance between the first end and the installation point is greater than a distance between the second end and the installation point, and a distance D obtained by subtracting a radius R of the circle from a distance L between the first end and a center of the circle is greater than or equal to 35 millimeters and is less than or equal to 70 millimeters.

20. The hand-held sweeper as claimed in claim 15, wherein a projection of the shield on a plane perpendicular to the first axis is substantially an arc, and an included angle formed by intersection of a connection line between one end of the arc and the first axis and a connection line between the other end of the arc and the first axis is greater than or equal to 120 degrees and is less than or equal to 150 degrees.

* * * * *